US012541270B2

(12) United States Patent
Park et al.

(10) Patent No.: US 12,541,270 B2
(45) Date of Patent: Feb. 3, 2026

(54) DISPLAY DEVICE COMPRISING TOUCH SENSOR

(71) Applicant: Samsung Display Co., Ltd., Yongin-si (KR)

(72) Inventors: Yong Hwan Park, Yongin-si (KR); Gyung Min Ko, Yongin-si (KR); Eun Young Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 158 days.

(21) Appl. No.: 18/523,560

(22) Filed: Nov. 29, 2023

(65) Prior Publication Data

US 2024/0292707 A1 Aug. 29, 2024

(30) Foreign Application Priority Data

Feb. 28, 2023 (KR) .................. 10-2023-0027335

(51) Int. Cl.
*G06F 3/044* (2006.01)
*H10K 59/122* (2023.01)
*H10K 59/35* (2023.01)
*H10K 59/40* (2023.01)
*G06F 3/041* (2006.01)
(Continued)

(52) U.S. Cl.
CPC ......... *G06F 3/0443* (2019.05); *H10K 59/122* (2023.02); *H10K 59/353* (2023.02); *H10K 59/40* (2023.02); *G06F 3/0412* (2013.01); *G06F 3/04164* (2019.05); *G06F 3/0446* (2019.05);
(Continued)

(58) Field of Classification Search
CPC .. G06F 3/04164; G06F 3/0446; G06F 3/0443; G06F 3/0412; G06F 2203/04111; H10K 59/40; H10K 59/121; H10K 59/353; H10K 59/131; H10K 59/122
See application file for complete search history.

(56) References Cited

U.S. PATENT DOCUMENTS 11,023,058 B2 6/2021 Park et al.
2014/0285729 A1* 9/2014 Lou ................. G06F 3/0412
349/12

(Continued)

FOREIGN PATENT DOCUMENTS

KR 10-2392171 B1 4/2022

*Primary Examiner* — William Boddie
*Assistant Examiner* — Saifeldin E Elnafia
(74) *Attorney, Agent, or Firm* — Womble Bond Dickinson (US) LLP

(57) ABSTRACT

A display device comprises a first pixel and a second pixel adjacent in a first direction, and a sensor a first conductive pattern layer and a second conductive pattern layer. The pixels include a first sub-pixel forming a first sub-pixel area emitting a first color, a second sub-pixel forming a second sub-pixel area emitting a second color, and a third sub-pixel forming a third sub-pixel area emitting a third color. The third sub-pixels of the first and second pixels are adjacent in the first direction. The first and second sub-pixels of the first pixel and the second pixel are adjacent in the first direction. The sensor comprises a first sensing electrode and a second sensing electrode, each comprising cells and bridges. A second bridge is not between the first and second sub-pixels of the first and second pixels, and extends between the third sub-pixels of the first and second pixels.

20 Claims, 20 Drawing Sheets

(51) Int. Cl.
*H10K 59/121* (2023.01)
*H10K 59/131* (2023.01)

(52) U.S. Cl.
CPC .. *G06F 2203/04111* (2013.01); *H10K 59/121* (2023.02); *H10K 59/131* (2023.02)

(56) References Cited

U.S. PATENT DOCUMENTS

| | | | |
|---|---|---|---|
| 2017/0364175 A1* | 12/2017 | Park | G06F 3/0445 |
| 2018/0033832 A1* | 2/2018 | Park | H10K 71/621 |
| 2020/0295092 A1* | 9/2020 | Moon | H10K 59/40 |
| 2021/0200365 A1* | 7/2021 | Lee | H10K 59/40 |
| 2022/0029138 A1* | 1/2022 | Wang | G06F 3/0446 |

* cited by examiner

FIG. 2
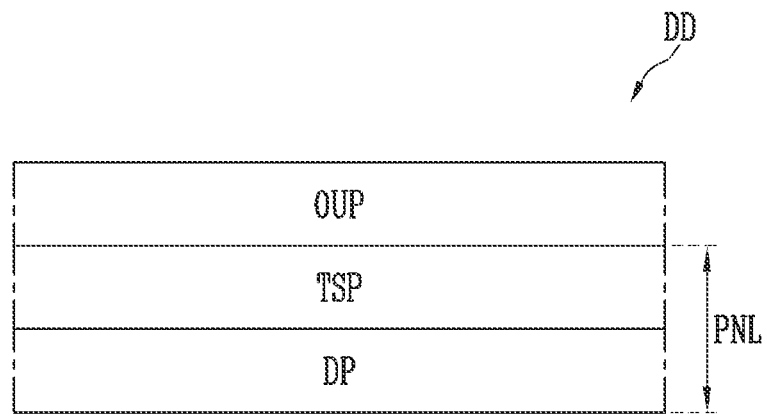
FIG. 3
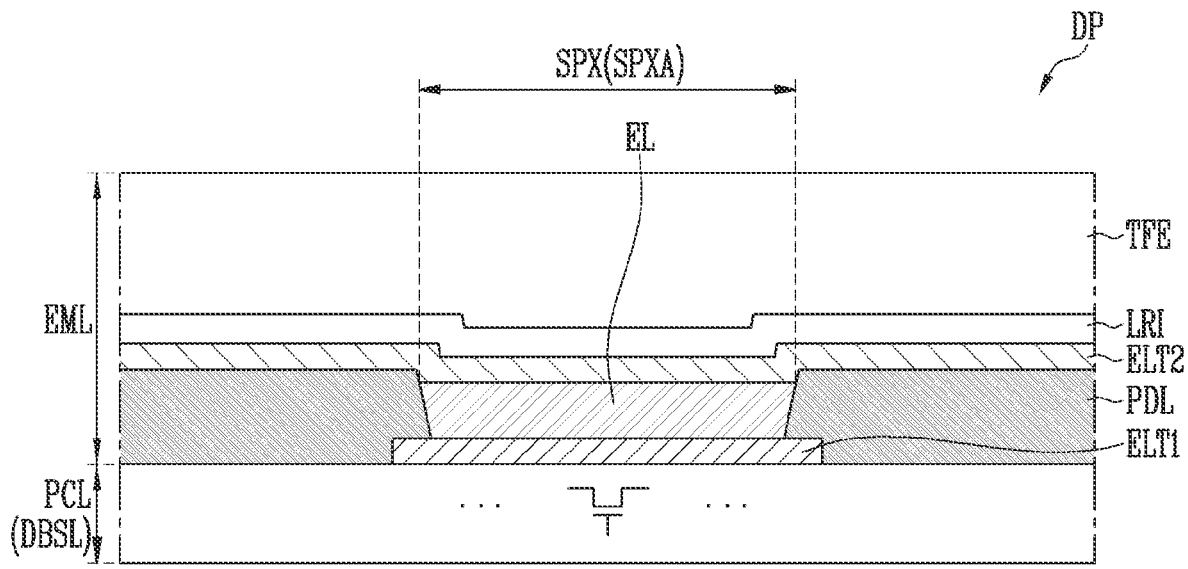
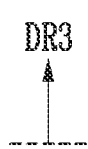

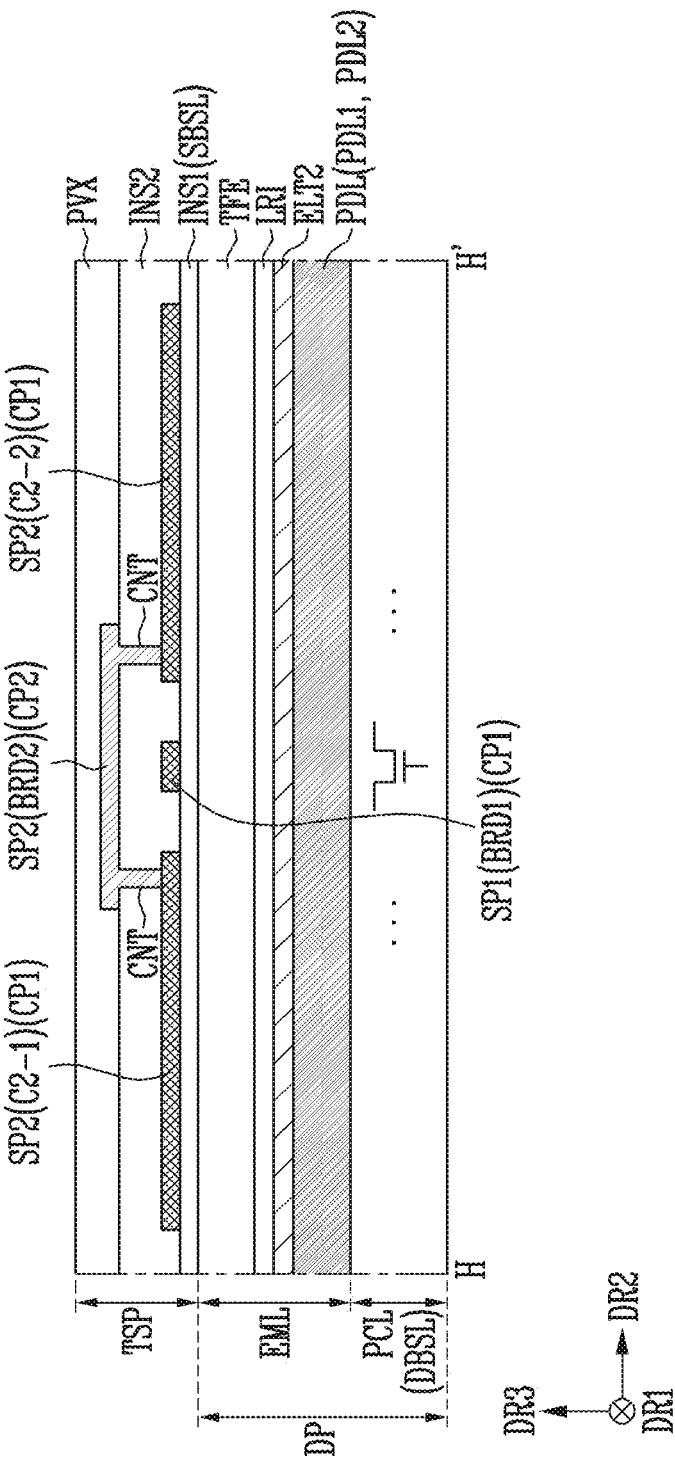

DISPLAY DEVICE COMPRISING TOUCH SENSOR

CROSS-REFERENCE TO RELATED APPLICATION

The present application claims priority to and benefits of Korean patent application No. 10-2023-0027335 filed on Feb. 28, 2023, in the Korean Intellectual Property Office, the entire content of which is incorporated herein by reference.

BACKGROUND

1. Field

Aspects of some embodiments of the present disclosure relates to a display device comprising a touch sensor.

2. Description of the Related Art

As information technology has developed, the importance of display devices, which provide a connection medium between users and information, has been highlighted. In response to this, the use of display devices such as liquid crystal display devices (LCD) and organic light emitting display devices (OLED) is increasing.

Display devices may include a display panel for displaying images and a sensing panel for sensing objects. The sensing panel may be used to determine a position of a touch input provided by the user.

Meanwhile, display devices may include a structure for improving visibility. For example, a risk that a light path provided by the display device may be interfered with by a conductive structure for forming the sensing panel may desirably be prevented.

The above information disclosed in this Background section is only for enhancement of understanding of the background and therefore the information discussed in this Background section does not necessarily constitute prior art.

SUMMARY

Aspects of some embodiments of the present disclosure include a display device having a touch sensor with relatively improved visibility and relatively improved light emission efficiency.

According to some embodiments of the present disclosure, a display device may comprise a display part on a base layer and forming a plurality of pixels comprising a first pixel and a second pixel, and a sensor part on the display part and comprising conductive pattern layers comprising a first conductive pattern layer and a second conductive pattern layer. Each of the plurality of pixels may comprise sub-pixels comprising a first sub-pixel forming a first sub-pixel area to which light of a first color is provided, a second sub-pixel forming a second sub-pixel area to which light of a second color is provided, and a third sub-pixel forming a third sub-pixel area to which light of a third color is provided. The first pixel and the second pixel may be adjacent to each other in a first direction. The third sub-pixel of the first pixel may be adjacent to the third sub-pixel of the second pixel in the first direction. The first sub-pixel and the second sub-pixel of the first pixel may be adjacent to the first sub-pixel and the second sub-pixel of the second pixel in the first direction. The conductive pattern layer may comprise a first sensing electrode and a second sensing electrode. The first sensing electrode may comprise first cells and a first bridge electrically connecting the first cells. The second sensing electrode may comprise second cells and a second bridge electrically connecting the second cells. The second bridge may not be between the first sub-pixel of the first pixel and the second sub-pixel of the second pixel, and at least a portion of the second bridge may be between the third sub-pixel of the first pixel and the third sub-pixel of the second pixel.

According to some embodiments, the second bridge may not overlap the first sub-pixel and the second sub-pixel on the first direction.

According to some embodiments, the second bridge may extend in a second direction different from the first direction.

According to some embodiments, the display part may comprise a light emitting unit and a pixel defining layer surrounding at least a portion of the light emitting unit. The pixel defining layer may comprise a first pixel defining layer overlapping the first sub-pixel and the second sub-pixel on the first direction and a second pixel defining layer overlapping the third sub-pixel on the first direction. The first pixel defining layer may have a first width. The second pixel defining layer may have a second width greater than the first width. The second bridge may be on the second pixel defining layer in a plan view.

According to some embodiments, the first pixel defining layer and the second pixel defining layer may be adjacent on a second direction different from the first direction. The second bridge may not overlap the first pixel defining layer on the first direction and may overlap the second pixel defining layer.

According to some embodiments, the second pixel defining layer may comprise an edge area comprising an area that does not overlap the second bridge in a plan view.

According to some embodiments, the first cells and the second cells may be spaced apart from each other with a separating line interposed therebetween. At least a portion of the separating line may extend on the first direction and may pass through the first sub-pixel and the second sub-pixel.

According to some embodiments, the separating line may not overlap the second bridge in a plan view.

According to some embodiments, the separating line may be a virtual line comprising an area in which the conductive pattern layers are not located.

According to some embodiments, the second bridge may be electrically connected to the second conductive pattern layer through a contact portion. The contact portion may not overlap the first sub-pixel area, the second sub-pixel area, and the third sub-pixel area on the first direction.

According to some embodiments, the contact portion may be between the first sub-pixel area and the second sub-pixel area, and the third sub-pixel area.

According to some embodiments, an area of the third sub-pixel area may be greater than an area of the first sub-pixel area and an area of the second sub-pixel area.

According to some embodiments, the third sub-pixel may form a plurality of third sub-pixels. The plurality of third sub-pixels may be spaced apart by a first distance in a first area and are spaced apart by a second distance greater than the first distance in a second area adjacent to the first area in the first direction.

According to some embodiments, the third sub-pixel may form a plurality of third sub-pixels. The plurality of third sub-pixels may be spaced apart from each other at a uniform distance on the first direction.

According to some embodiments, the display device may further comprise an additional bridge having a structure corresponding to the second bridge. The second bridge and the additional bridge may be formed by the second conductive pattern layer.

According to some embodiments, the additional bridge may not overlap the separating line in a plan view.

According to some embodiments, the display device may further comprise a cutting area in which at least a portion of the second conductive pattern layer is cut in an area where the first cells or the second cells are formed.

According to some embodiments, the second bridge may be formed by the first conductive pattern layer.

According to some embodiments, the second bridge may be formed by the second conductive pattern layer.

According to some embodiments of the present disclosure, a display device may comprise a display part formed on a base layer and forming a plurality of pixels comprising a first pixel and a second pixel, and a sensor part on the display part and comprising conductive pattern layers comprising a first conductive pattern layer and a second conductive pattern layer. Each of the plurality of pixels may comprise sub-pixels comprising a first sub-pixel forming a first sub-pixel area to which light of a first color is provided, a second sub-pixel forming a second sub-pixel area to which light of a second color is provided, and a third sub-pixel forming a third sub-pixel area to which light of a third color is provided. The first pixel and the second pixel may be adjacent to each other in a first direction. The third sub-pixel of the first pixel may be adjacent to the third sub-pixel of the second pixel in the first direction. The first sub-pixel and the second sub-pixel of the first pixel may be adjacent to the first sub-pixel and the second sub-pixel of the second pixel in the first direction. The display part may comprise a light emitting unit and a pixel defining layer surrounding at least a portion of the light emitting unit. The pixel defining layer may surround at least a portion of each of the first sub-pixel area, the second sub-pixel area, and the third sub-pixel area in a plan view. The conductive pattern layer may comprise a first sensing electrode and a second sensing electrode. The first sensing electrode may comprise first cells and a first bridge electrically connecting the first cells. The second sensing electrode may comprise second cells and a second bridge electrically connecting the second cells. The pixel defining layer may comprise a first pixel defining layer overlapping the first sub-pixel and the second sub-pixel on the first direction and a second pixel defining layer overlapping the third sub-pixel on the first direction. The first pixel defining layer may have a first width. The second pixel defining layer may have a second width greater than the first width. At least a portion of the second bridge may extend in a second direction different from the first direction. The second bridge may be on the second pixel defining layer in a plan view.

According to some embodiments of the present disclosure, a display device comprising a touch sensor with relatively improved visibility and relatively improved light emission efficiency may be provided.

BRIEF DESCRIPTION OF THE DRAWINGS

The above and other features of the disclosure will become more apparent by describing in further detail embodiments thereof with reference to the accompanying drawings, in which:

FIG. 2 is a schematic cross-sectional view illustrating a stack structure of a display device according to some embodiments;

FIG. 3 is a schematic cross-sectional view illustrating a display part according to some embodiments;

FIGS. 21 and 22 are schematic cross-sectional views illustrating the display device according to some embodiments.

DETAILED DESCRIPTION

Figure 1:
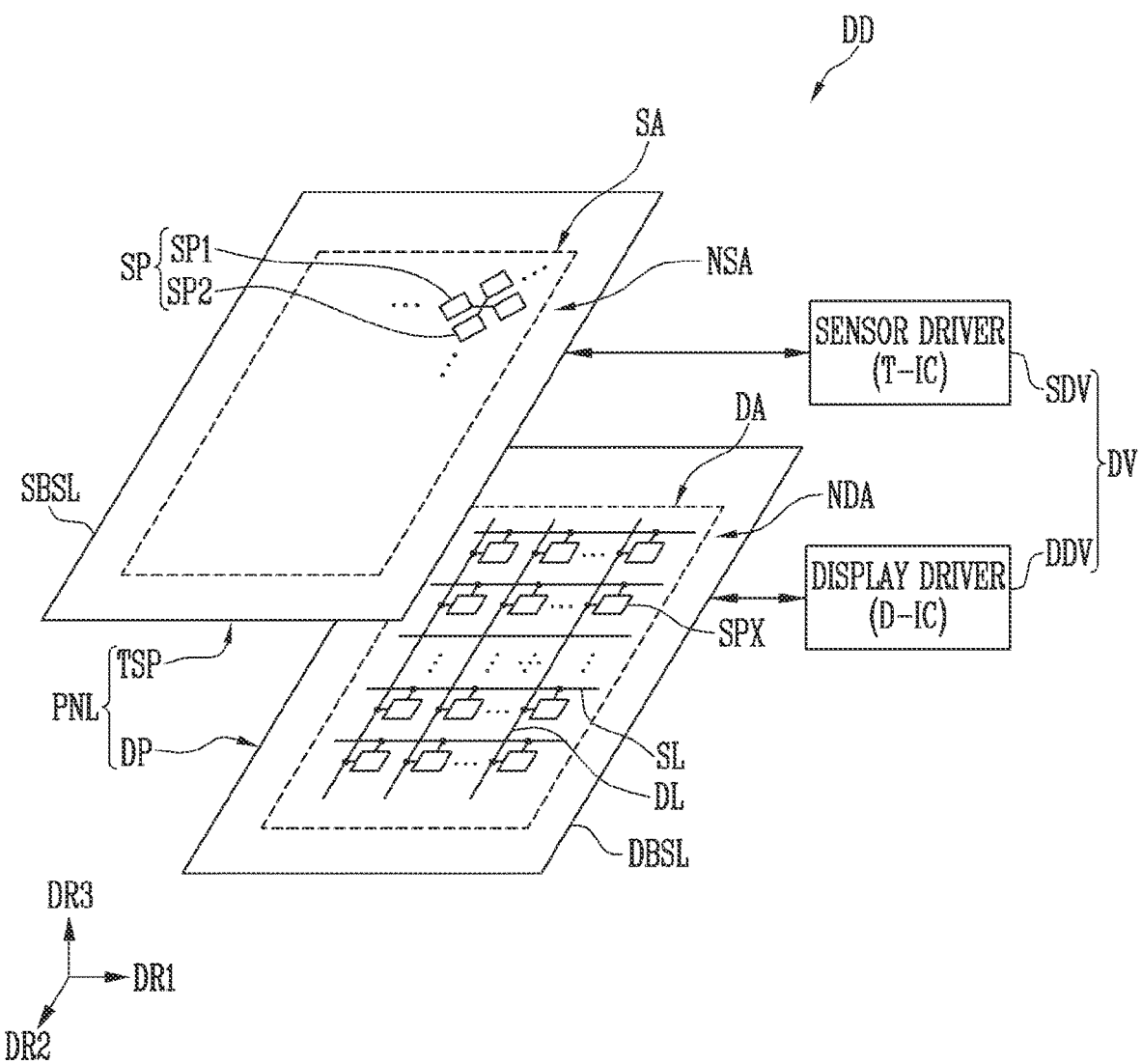
FIG. 1 is a diagram illustrating a display device according to some embodiments.

The disclosure may be modified in various manners and have various forms. Therefore, specific embodiments will be illustrated in the drawings and will be described in more detail in the specification. However, it should be understood that the disclosure is not intended to be limited to the disclosed specific forms, and the disclosure comprises all modifications, equivalents, and substitutions within the spirit and technical scope of the disclosure.

Terms of "first", "second", and the like may be used to describe various components, but the components should not be limited by the terms. The terms are used only for the purpose of distinguishing one component from another component. For example, without departing from the scope of the disclosure, a first component May be referred to as a second component, and similarly, a second component may also be referred to as a first component. In the following description, the singular expressions comprise plural expressions unless the context clearly dictates otherwise.

It should be understood that in the present application, a term of "comprise", "have", or the like is used to specify that there is a feature, a number, a step, an operation, a component, a part, or a combination thereof described in the specification, but does not exclude a possibility of the presence or addition of one or more other features, numbers, steps, operations, components, parts, or combinations thereof in advance. In addition, a case where a portion of a layer, a layer, an area, a plate, or the like is referred to as being "on" another portion, it comprises not only a case where the portion is "directly on" another portion, but also a case where there is further another portion between the portion and another portion. In addition, in the present specification, when a portion of a layer, a layer, an area, a plate, or the like is formed on another portion, a forming direction is not limited to an upper direction but comprises forming the portion on a side surface or in a lower direction. On the contrary, when a portion of a layer, a layer, an area, a plate, or the like is formed "under" another portion, this comprises not only a case where the portion is "directly beneath" another portion but also a case where there is further another portion between the portion and another portion.

Aspects of some embodiments of the present disclosure relate to a display device comprising a touch sensor. Hereinafter, a display device comprising a touch sensor according to some embodiments is described with reference to the accompanying drawings.

FIG. 1 is a diagram illustrating a display device according to some embodiments. FIG. 2 is a schematic cross-sectional view illustrating a stack structure of a display device according to some embodiments.

Referring to FIGS. 1 and 2, the display device DD is configured to provide (or emit) light and/or display images. The display device DD may include a panel PNL and a driving circuit unit DV for driving the panel PNL. The display device DD may further include an outer part OUP.

The panel PNL may comprise a display part (or display or display panel) DP for displaying images and a sensor part TSP capable of sensing a user input (for example, a touch input, e.g., from a user's finger or a stylus). The display part DP may be referred to as a display panel. The sensor part (or sensor or sensing panel) TSP may be referred to as a sensing panel.

The panel PNL may comprise sub-pixels SPX and sensing electrodes SP. According to some embodiments, the sub-pixels SPX may collectively display images in a display frame period unit. The sensing electrodes SP may sense an input (for example, a touch input) of a user in a sensing frame period unit. A sensing frame period and a display frame period may be independent of each other or may be different from each other. The sensing frame period and the display frame period May be synchronized with each other or may be asynchronous.

The sensor part TSP comprising the sensing electrodes SP may obtain information from or based on the touch input of the user. According to some embodiments (for example, a mutual capacitance method), the sensing electrodes SP may comprise a first sensing electrode SP1 providing a first sensing signal and a second sensing electrode SP2 providing a second sensing signal. According to some embodiments, the first sensing electrode SP1 may be a Tx (transmitter) pattern electrode, and the second sensing electrode SP2 may be an Rx (receiver) pattern electrode. The information on the touch input (or a touch event) may mean information comprising a position or the like of a touch that the user wants to provide.

However, embodiments according to the present disclosure are not limited thereto. For example, according to some embodiments (for example, a self-capacitance method), the sensing electrodes SP may be configured of one type of sensing electrodes without distinction between the first sensing electrode SP1 and the second sensing electrode SP2.

The driving circuit unit DV may comprise a display driver DDV for driving the display part DP and a sensor driver SDV for driving the sensor part TSP.

The display part DP may comprise a display base layer DBSL and the sub-pixels SPX provided on the display base layer DBSL. The sub-pixels SPX may be located in a display area DA.

The display base layer DBSL (or the display device DD) may comprise the display area DA in which images are displayed and a non-display area NDA outside the display area DA. According to some embodiments, the display area DA may be located in a central area of the display part DP, and the non-display area NDA may be located adjacent to or in a periphery (e.g., outside a footprint) of the display area DA.

The display base layer DBSL may be a base substrate or a base member for supporting the display device DD. The base layer may be a rigid substrate of a glass material. Alternatively, the base layer may be a flexible substrate of which bending, folding, rolling, or the like may be performed without damaging the display device DD. In this case, the base layer may comprise an insulating material such as a polymer resin such as polyimide. However, embodiments according to the present disclosure are not particularly limited thereto.

Scan lines SL and data lines DL, and the sub-pixels SPX connected to the scan lines SL and the data lines DL may be located in the display area DA. The sub-pixels SPX may be configured to be selected by a scan signal of a turn-on level supplied from the scan lines SL, receive a data signal from the data lines DL, and emit light of a luminance corresponding to the data signal. Accordingly, an image corresponding to the data signal is displayed in the display area DA. However, in the disclosure, a structure, a driving method, and the like of the sub-pixels SPX are not particularly limited.

Various lines and/or built-in circuit units connected to the sub-pixels SPX of the display area NDA may be located in the non-display area NDA. For example, a plurality of lines for supplying various power and control signals to the display area DA may be located in the non-display area NDA.

The display part DP may output or display visual information (for example, an image). According to some embodiments, a type/kind of the display part DP is not particularly limited. For example, the display part DP may be implemented as a self-emission type of display panel such as an organic light emitting display panel. However, when the display part DP is implemented as a self-emission type, each pixel is not limited to a case in which only an organic light emitting element is utilized. For example, a light emitting element of each pixel may be formed of an organic light emitting diode, an inorganic light emitting diode, a quantum dot/well light emitting diode, or the like. According to some embodiments, the display part DP may be implemented as a non-emission type of display panel such as a liquid crystal display panel. When the display part DP is implemented as a non-emission type, the display device DD may additionally comprise a light source such as a back-light unit.

Hereinafter, for convenience of description, the disclosure is described based on some embodiments in which the display part DP is implemented as an organic light emitting display panel, but as described above, embodiments according to the present disclosure are not limited thereto.

The sensor part TSP comprises a sensor base layer SBSL and a plurality of sensing electrodes SP formed on the sensor base layer SBSL. The sensing electrodes SP may be located in a sensing area SA on the sensor base layer SBSL.

The sensor base layer SBSL (or the display device DD) may comprise a sensing area SA where a touch input or the like may be sensed, and a non-sensing area NSA around the sensing area SA. According to some embodiments, the sensing area SA may be arranged to overlap at least one area of the display area DA. For example, the sensing area SA may be set or formed as an area corresponding to the display area DA (for example, an area overlapping the display area DA), and the non-sensing area NSA may be set or formed as an area corresponding to the non-display area NDA (for example, an area overlapping the non-display area NDA). In this case, when the touch input or the like is provided on the display area DA, the touch input may be detected through the sensor part TSP. Embodiments according to the present disclosure are not limited thereto, however. For example, according to some embodiments, the sensing area SA may extend over at least a portion of the non-display area NDA).

The sensor base layer SBSL may comprise one or more insulating layers (for example, a first insulating layer INS1 (refer to FIG. 4)). For example, the first insulating layer INS1 for forming the sensor base layer SBSL may be located on the display part DP to form a base for forming the sensing electrodes SP. However, an example for forming the sensor base layer SBSL is not particularly limited.

The sensing area SA is set as an area capable of responding to the touch input (that is, an active area of a sensor). To this end, the sensing electrodes SP for sensing the touch input or the like may be located in the sensing area SA.

The sensor part TSP may obtain information on an input provided from the user. The sensor part TSP may recognize the touch input. The sensor part TSP may recognize the touch input using a capacitive sensing method. The sensor part TSP may sense the touch input using a mutual capacitance method or may sense the touch input using a self-capacitance method.

According to some embodiments, each of the first sensing electrodes SP1 may extend in a first direction DR1. The first sensing electrodes SP1 may be arranged in a second direction DR2. The second direction DR2 may be different from the first direction DR1. For example, the second direction DR2 may be a direction perpendicular to the first direction DR1.

According to some embodiments, each of the second sensing electrodes SP2 may extend in the second direction DR2. The second sensing electrodes SP2 may be arranged in the first direction DR1.

According to some embodiments, the first sensing electrodes SP1 and the second sensing electrodes SP2 may have the same (for example, substantially the same) shape. For example, the first sensing electrodes SP1 which are Tx patterns and the second sensing electrodes SP2 which are Rx patterns may have corresponding shapes (for example, the same or substantially the same shape), and thus sensing performance of the touch event may be uniformly set within the sensing area SA.

Meanwhile, sensing lines for electrically connecting the sensing electrodes SP to the sensor driver SDV and the like may be located in the non-sensing area NSA of the sensor part TSP.

The driving circuit unit DV may comprise a display driver DDV for driving the display part DP and a sensor driver SDV for driving the sensor part TSP.

The display driver DDV is configured to be electrically connected to the display part DP to drive the sub-pixels SPX. The sensor driver SDV is configured to be electrically connected to the sensor part TSP to drive the sensor part TSP.

The outer part OUP may be substantially located outside the display device DD. The outer part OUP may be located on the sensor part TSP. Light provided from the display part DP may pass through the outer part OUP and may be output to the outside. According to some embodiments, the outer part OUP may comprise a window. According to some embodiments, the outer part OUP may comprise a reflection control layer RCL (refer to FIG. 8) and a light blocking layer LBL (refer to FIG. 8). According to some embodiments, the outer part OUP may comprise color filters CF1, CF2, and CF3 (refer to FIG. 9).

Next, referring to FIG. 3, aspects of the display part DP according to some embodiments is described. FIG. 3 is a schematic cross-sectional view illustrating a display part according to some embodiments.

Referring to FIG. 3, the display part DP may comprise a pixel circuit layer PCL and a light emitting element layer EML.

The pixel circuit layer PCL may comprise a pixel circuit for driving light emitting elements LD. The pixel circuit layer PCL may comprise the display base layer DBSL, conductive layers for forming pixel circuits, and insulating layers located between the conductive layers.

The pixel circuit may comprise a thin film transistor. The pixel circuit may comprise a driving transistor. The pixel circuit may be electrically connected to the light emitting elements LD to provide an electrical signal for the light emitting elements LD to emit light.

The light emitting element layer EML may be located on the pixel circuit layer PCL. According to some embodiments, the light emitting element layer EML may comprise the light emitting element LD, a pixel defining layer PDL, a low-reflection inorganic layer LRI, and an encapsulation layer TFE.

The light emitting element LD may be located on the pixel circuit layer PCL. According to some embodiments, the light emitting element LD may comprise a first electrode ELT1, an emission layer EL, and a second electrode ELT2. According to some embodiments, the emission layer EL may be located in an area defined by the pixel defining layer PDL. The pixel defining layer PDL may be adjacent to a periphery of the emission layer EL. A surface of the emission layer EL may be electrically connected to the first electrode ELT1, and another surface of the emission layer EL may be electrically connected to the second electrode ELT2.

The first electrode ELT1 may be an anode electrode for the emission layer EL, and the second electrode ELT2 may be a common electrode (or a cathode electrode) for the emission layer EL. According to some embodiments, the first electrode ELT1 and the second electrode ELT2 may comprise a conductive material. For example, the first electrode ELT1 may comprise a conductive material having a reflective property, and the second electrode ELT2 may comprise a transparent conductive material. However, embodiments according to the present disclosure are not limited thereto.

The emission layer EL may have a multilayer thin film structure comprising a light generation layer. The emission layer EL may comprise a hole injection layer for injecting a hole, a hole transport layer having an excellent hole transport property and for increasing a chance of recombination of a hole and an electron by suppressing a movement of an electron that is not combined in the light generation layer, the light generation layer for emitting light by the recombination of the injected electron and hole, a hole blocking layer for suppressing a movement of a hole that is not combined in the light generation layer, an electron transport layer for smoothly transporting the electron to the light generation layer, and an electron injection layer for injecting the electron. The emission layer EL may emit light based on an electrical signal provided from the first electrode ELT1 and the second electrode ELT2.

The emission layer EL may form a sub-pixel SPX. The emission layer EL may form a sub-pixel area SPXA from which light of a color is emitted. In a plan view (e.g., in a view perpendicular or normal with respect to a display surface of the display device DD), an area of the emission layer EL and the sub-pixel area SPXA may correspond to each other. For example, each emission layer EL may correspond to each sub-pixel area SPXA.

The pixel defining layer PDL may be located on the pixel circuit layer PCL to define a position where the emission layer EL is arranged. The pixel defining layer PDL may comprise an organic material. According to some embodiments, the pixel defining layer PDL may comprise one or more of a group of acrylic resin, epoxy resin, phenol resin, polyamide resin, and polyimide resin. However, embodiments according to the present disclosure are not limited thereto. For example, the pixel defining layer PDL may comprise an inorganic material.

The low-reflection inorganic layer LRI may be located on the light emitting element LD (for example, the second electrode ELT2). The low-reflection inorganic layer LRI may be located between the encapsulation layer TFE and the light emitting element LD.

The low-reflection inorganic layer LRI may comprise an inorganic material. For example, the low-reflection inorganic layer LRI may comprise one or more of a metal or a metal compound in consideration of a refractive index and an absorption coefficient. The low-reflection inorganic layer LRI may absorb light applied from the outside into the display device DD and reduce an external light reflectance of the display device DD. Accordingly, display quality and visibility of the display device DD may be relatively improved by comprising the low-reflection inorganic layer LRI.

The encapsulation layer TFE may be located on the low-reflection inorganic layer LRI. The encapsulation layer TFE may offset a step difference generated by the light emitting element LD, the low-reflection inorganic layer LRI, and the pixel defining layer PDL. The encapsulation layer TFE may comprise a plurality of insulating layers covering the light emitting element LD. According to some embodiments, the encapsulation layer TFE may have a structure in which an inorganic layer and an organic layer are alternately stacked. According to some embodiments, the encapsulation layer TFE may be a thin film encapsulation layer.

Next, aspects of the sensor part TSP are described with reference to FIGS. 4 to 8.

Figure 4:
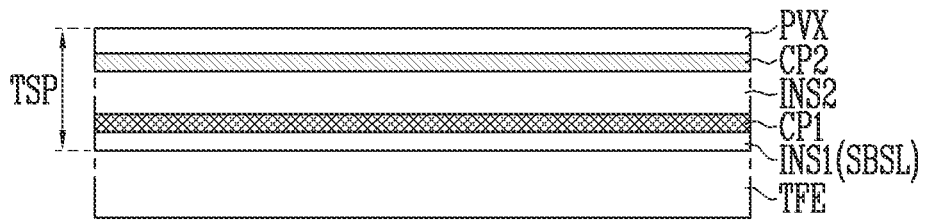
FIG. 4 is a schematic cross-sectional view illustrating a sensing unit according to some embodiments.
Figure 5:
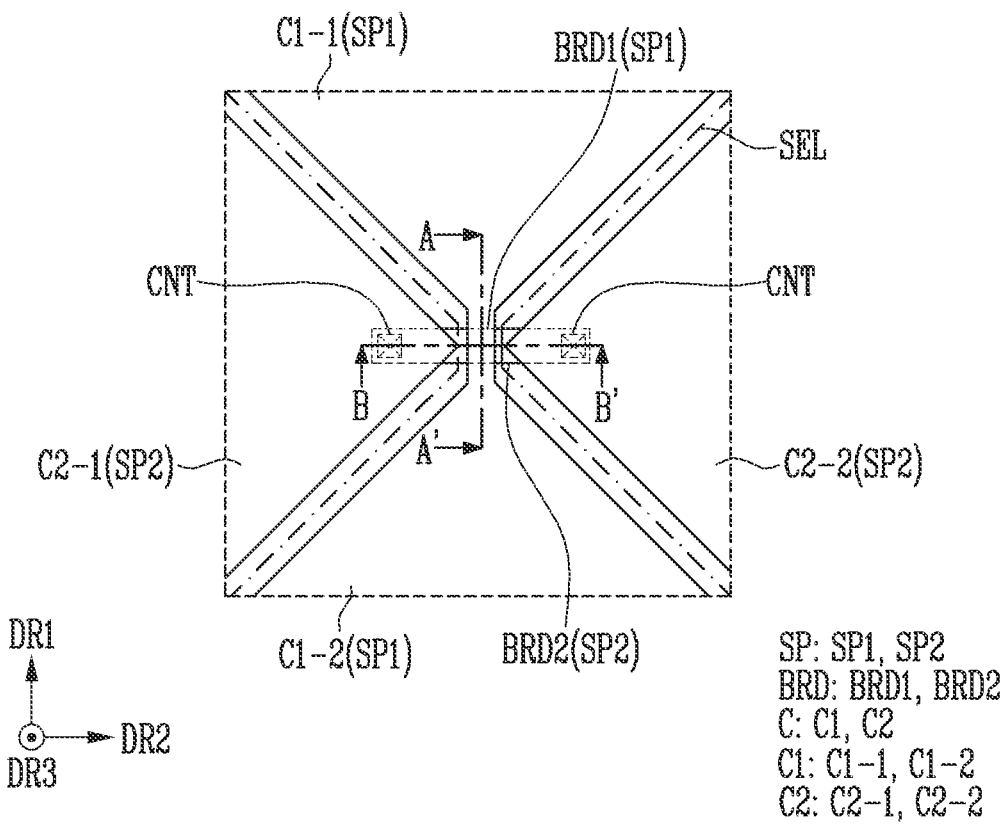
FIGS. 5 and 6 are schematic plan views illustrating sensing electrodes according to some embodiments.
Figure 6:
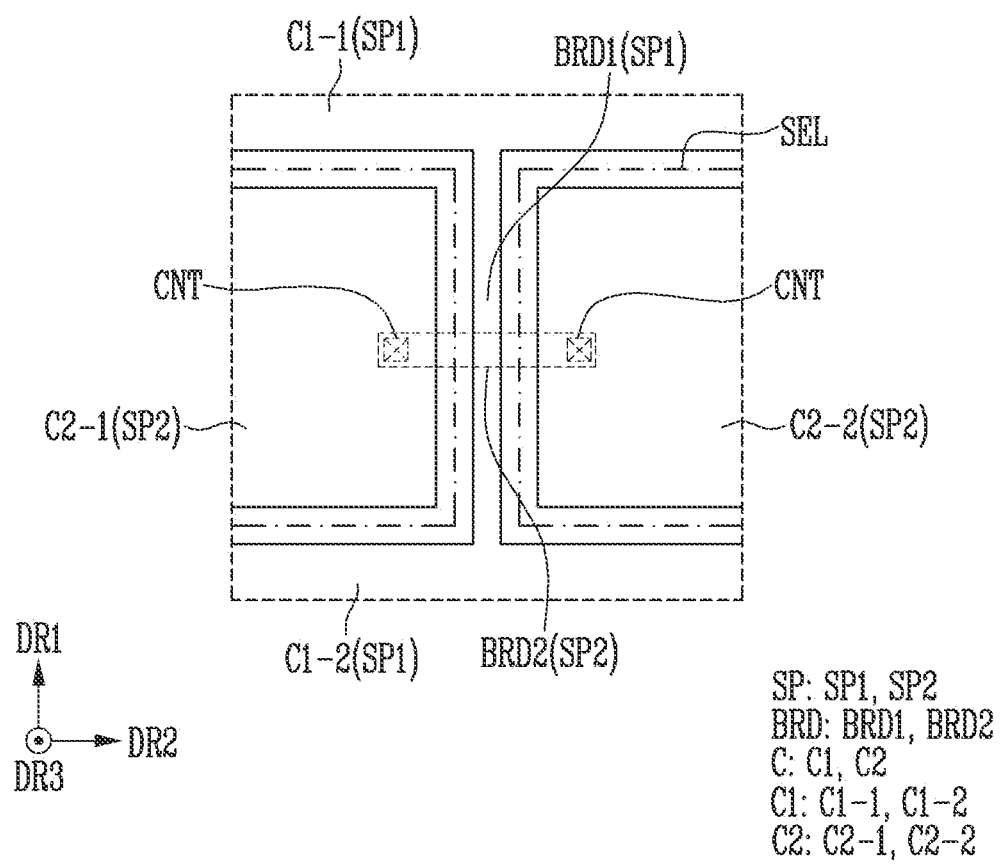
Figure 7:
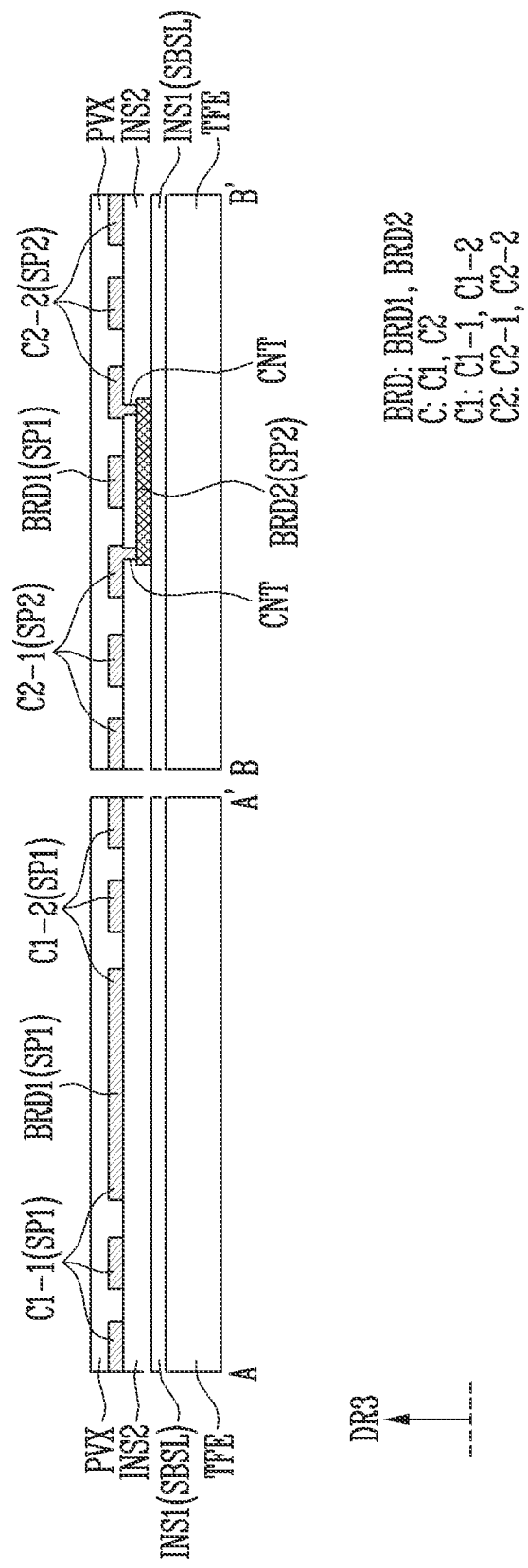
FIG. 7 is a schematic cross-sectional view illustrating a sensing unit according to some embodiments.

FIG. 4 is a schematic cross-sectional view illustrating a sensing unit according to some embodiments. FIGS. 5 and 6 are schematic plan views illustrating sensing electrodes according to some embodiments. FIGS. 5 and 6 show a schematic planar structure illustrating an area where the first sensing electrode SP1 and the second sensing electrode SP2 are adjacent to each other. FIGS. 5 and 6 show a planar structure of the first sensing electrode SP1 and the second sensing electrode SP2 each having one shape according to some embodiments. FIG. 7 is a schematic cross-sectional view illustrating a sensing unit according to some embodiments. FIG. 7 shows a schematic cross-sectional structure taken on a line A~A' of FIG. 5 and a cross-sectional structure taken on a line B~B' of FIG. 5.

Referring to FIGS. 4 to 7, the sensor part TSP may be located on the encapsulation layer TFE. The sensor part TSP may comprise the first insulating layer INS1, a first conductive pattern layer CP1, a second insulating layer INS2, a second conductive pattern layer CP2, and a protective layer PVX.

According to some embodiments, the first conductive pattern layer CP1 and the second conductive pattern layer CP2 may be patterned in an area to form the sensing electrodes SP. For example, a portion of the first conductive pattern layer CP1 may configure the first sensing electrode SP1, and a portion of each of the first conductive pattern layer CP1 and the second conductive pattern layer CP2 may configure the second sensing electrode SP2. Alternatively, a portion of the second conductive pattern layer CP2 may configure the first sensing electrode SP1, and a portion of each of the first conductive pattern layer CP1 and the second conductive pattern layer CP2 may configure the second sensing electrode SP2. However, embodiments according to the present disclosure are not limited thereto.

The first insulating layer INS1 may be located on the encapsulation layer TFE. The first insulating layer INS1 may form the sensor base layer SBSL to provide an area where the first conductive pattern layer CP1, the second insulating layer INS2, the second conductive pattern layer CP2, and the protective layer PVX are located.

The first conductive pattern layer CP1 may be located on the first insulating layer INS1. The second conductive pattern layer CP2 may be located on the second insulating layer INS2. The first conductive pattern layer CP1 and the second conductive pattern layer CP2 may be spaced apart from each other with the second insulating layer INS2 interposed therebetween.

The first conductive pattern layer CP1 and the second conductive pattern layer CP2 may comprise a metal layer of a single layer or multiple layers. The first conductive pattern layer CP1 and the second conductive pattern layer CP2 may comprise at least one of various metal materials comprising gold (Au), silver (Ag), aluminum (Al), molybdenum (Mo), chromium (Cr), titanium (Ti), nickel (Ni), neodymium (Nd), copper (Cu), or platinum (Pt), and/or an alloy thereof. According to some embodiments, the first conductive pattern layer CP1 and the second conductive pattern layer CP2 may comprise at least one of various transparent conductive materials comprising one of a silver nanowire (AgNW), indium tin oxide (ITO), indium zinc oxide (IZO), indium gallium zinc oxide (IGZO), antimony zinc oxide (AZO), indium tin zinc oxide (ITZO), zinc oxide (ZnO), tin oxide (SnO2), carbon nano tube, or graphene.

The second insulating layer INS2 may be located on the first conductive pattern layer CP1. The second insulating layer INS2 may be interposed between the first conductive pattern layer CP1 and the second conductive pattern layer CP2. The protective layer PVX may be located on the second conductive pattern layer CP2.

The first insulating layer INS1 may comprise one or more of an inorganic material and an organic material. The second insulating layer INS2 may comprise one or more of an inorganic material and an organic material. According to some embodiments, the protective layer PVX may comprise an organic material. The inorganic material may comprise one or more of a group of silicon nitride (SiNx), silicon oxide (SiOx), silicon oxynitride (SiOxNy), and aluminum oxide (AlOx). The organic material may comprise one or more of a group of acrylic resin, epoxy resin, phenol resin, polyamide resin, and polyimide resin. However, embodiments according to the present disclosure are not limited thereto.

According to some embodiments, when the second insulating layer INS2 comprises an organic material, a short risk between the first conductive pattern layer CP1 and the second conductive pattern layer CP2 may be reduced. Accordingly, even though a thickness of at least one of the first conductive pattern layer CP1 or the second conductive pattern layer CP2 is increased, a structural risk may be reduced, and thus a process design freedom degree may be relatively improved.

The sensing electrodes SP may comprise a cell C and a bridge BRD. The cell C may have a relatively large area, and the bridge BRD may have a relatively small area. Cells C adjacent to each other may be electrically connected by the bridge BRD. The cell C may comprise a first cell C1 and a second cell C2. The bridge BRD may comprise a first bridge BRD1 and a second bridge BRD2.

According to some embodiments, the first cell C1 and the second cell C2 may be formed by the second conductive pattern layer CP2. The first bridge BRD1 may be formed by the second conductive pattern layer CP2. A portion of the second bridge BRD2 may be formed by the first conductive pattern layer CP1, and another portion of the second bridge BRD2 may be formed by the second conductive pattern layer CP2.

However, embodiments according to the present disclosure are not necessarily limited thereto. For example, the first cell C1 and the second cell C2 may be formed by the first conductive pattern layer CP1. The first bridge BRD1 may be formed by the first conductive pattern layer CP1. A portion of the second bridge BRD2 may be formed by the second conductive pattern layer CP2, and another portion of the second bridge BRD2 may be formed by the first conductive pattern layer CP1.

According to some embodiments, the sensing electrodes SP may have a mesh structure. The cells C and the bridges BRD may have a mesh structure. For example, the second conductive pattern layer CP2 for forming the sensing electrodes SP may be patterned according to the mesh structure. Because the sensing electrodes SP have the mesh structure, a capacitance that may be formed with other electrodes located under the cells C may be reduced.

The first sensing electrode SP1 may have a structure in which the first cells C1 of a relatively large area and the first bridge BRD1 of a relatively small area are connected to each other. For example, the first cell C1 may comprise a (1-1)-th cell C1-1 and a (1-2)-th cell C1-2, and the first bridge BRD1 may electrically connect the (1-1)-th cell C1-1 and the (1-2)-th cell C1-2.

The second sensing electrode SP2 may have a structure in which the second cells C2 of a relatively large area and the second bridge BRD2 of a relatively small area are connected to each other. For example, the second cell C2 may comprise a (2-1)-th cell C2-1 and a (2-2)-th cell C2-2, and the second bridge BRD2 may electrically connect the (2-1)-th cell C2-1 and the (2-2)-th cell C2-2.

According to some embodiments, the second bridge BRD2 may be electrically connected to the (2-1)-th cell C2-1 through a contact portion CNT and may be electrically connected to the (2-2)-th cell C2-2 through the another contact portion CNT. Accordingly, the second bridge BRD2 located on a layer different from that of the second cell C2 may electrically connect the (2-1)-th cell C2-1 and the (2-2)-th cell C2-2 through the contact portion CNT. According to some embodiments, the contact portion CNT may pass through the second insulating layer INS2.

The first cell C1 and the second cell C2 may generally have a diamond shape (FIG. 5). However, a shape of the first cell C1 and the second cell C2 is not particularly limited thereto. For example, the first cell C1 and the second cell C2 may have a generally quadrangular shape (FIG. 6).

The first sensing electrodes SP1 and the second sensing electrodes SP2 may be adjacent to each other with a separating line SEL interposed therebetween. The separating line SEL may be a virtual line located in an area between the first sensing electrodes SP1 and the second sensing electrodes SP2. For example, the separating line SEL may be located between the (1-1)-th cell C1-1 and the (1-2)-th cell C1-2. The separating line SEL may be located between the first bridge BRD1 and the (1-2)-th cell C1-2.

Figure 8:
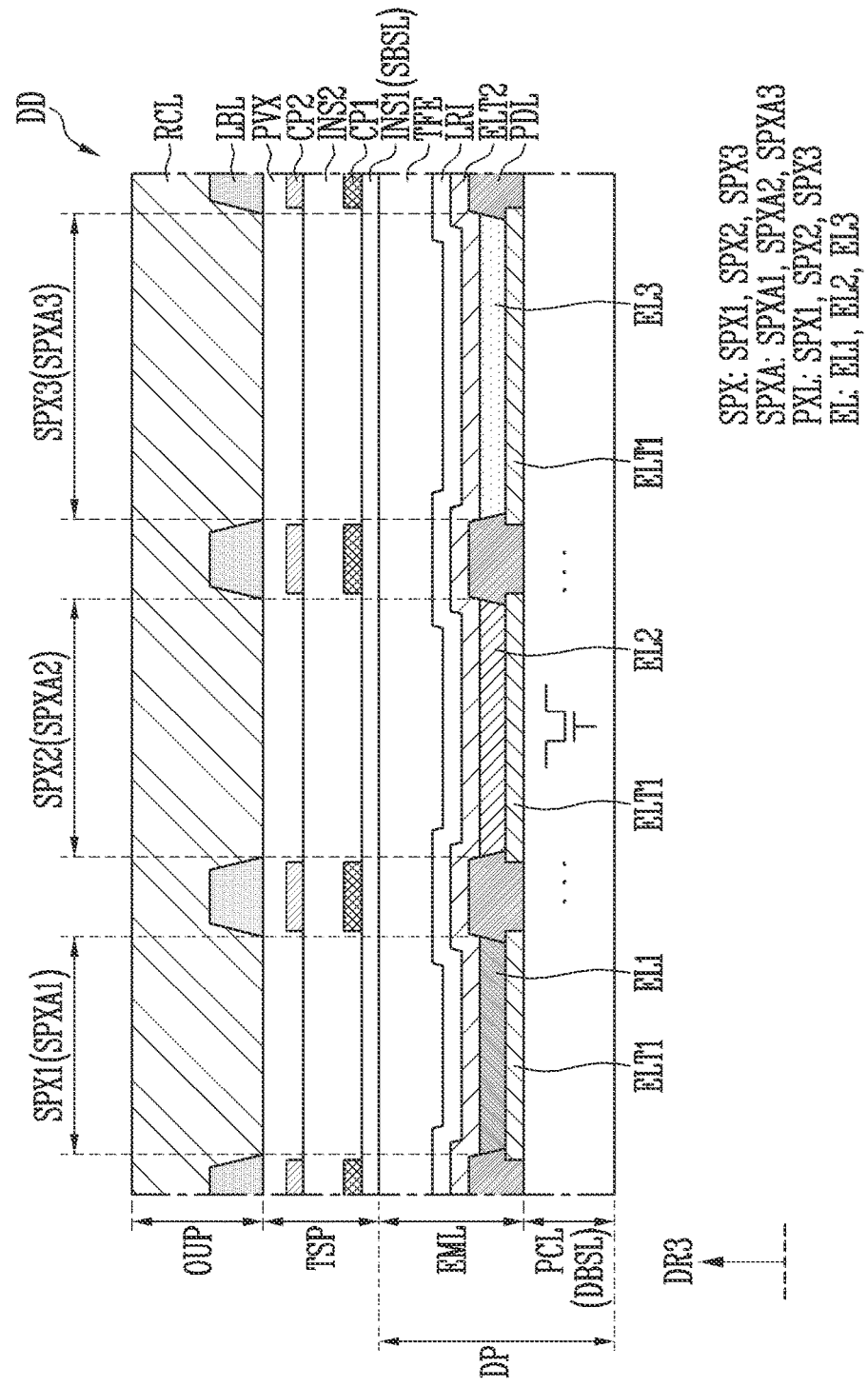
FIGS. 8 and 9 are schematic cross-sectional views illustrating a display device according to some embodiments.
Figure 9:
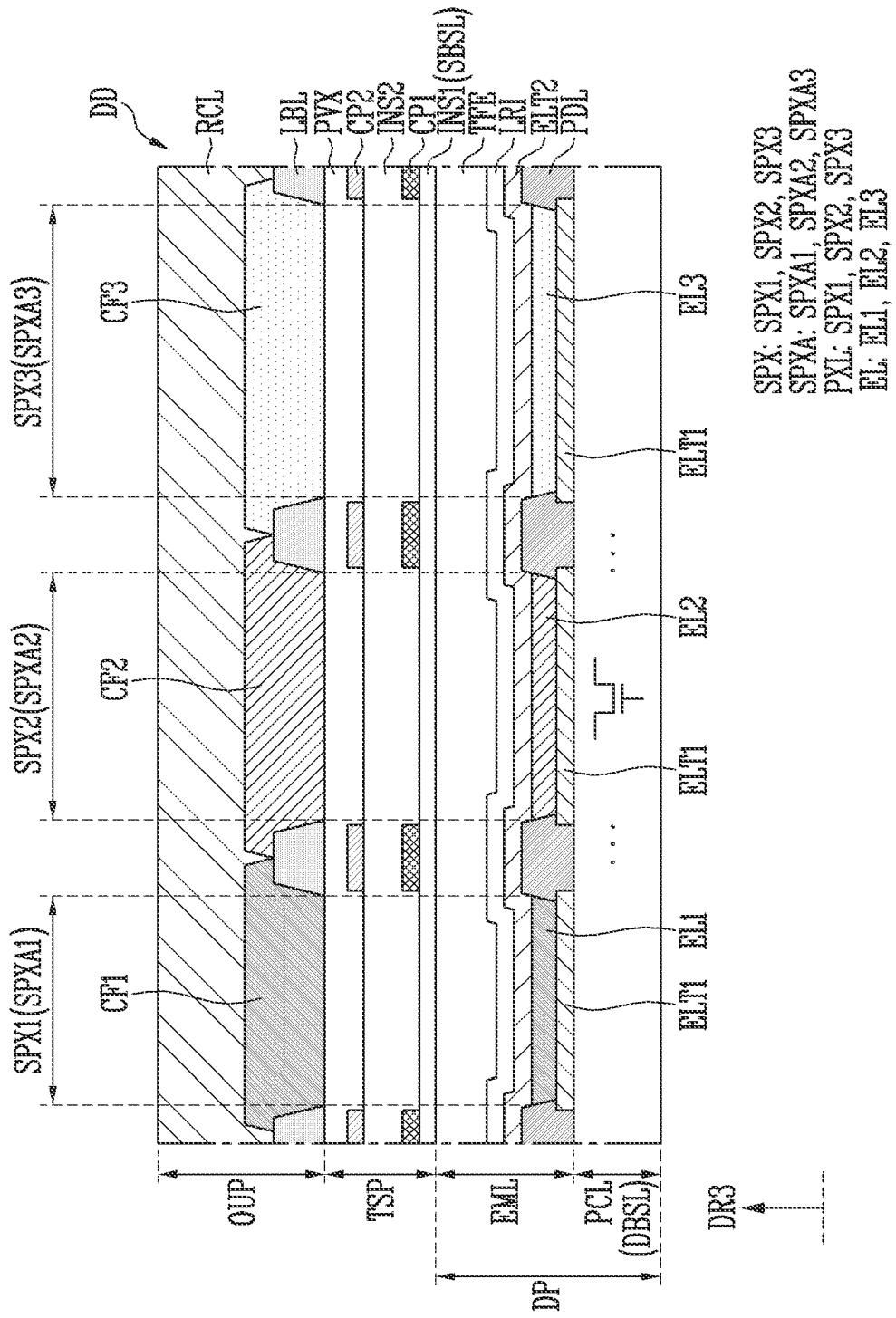

Next, a cross-sectional structure of the display device DD according to some embodiments is described with reference to FIGS. 8 and 9. FIGS. 8 and 9 are schematic cross-sectional views illustrating a display device according to some embodiments.

Referring to FIG. 8, the emission layer EL may comprise a first emission layer EL1 comprised in a first sub-pixel SPX1, a second emission layer EL2 comprised in a second sub-pixel SPX2, and a third emission layer EL3 comprised in a third sub-pixel SPX3. The first emission layer EL1 may emit light of a first color (for example, red) and may form a first sub-pixel area SPXA1. The second emission layer EL2 may emit light of a second color (for example, green) and may form a second sub-pixel area SPXA2. The third emission layer EL3 may emit light of a third color (for example, blue) and may form a third sub-pixel area SPXA3.

In the sensor part TSP, the first conductive pattern layer CP1 and the second conductive pattern layer CP2 may be located on different layers to form a structure of the sensing electrodes SP.

The outer part OUP may be located on the sensor part TSP. The outer part OUP may comprise the light blocking layer LBL and the reflection control layer RCL.

The light blocking layer LBL may overlap the first conductive pattern layer CP1 and the second conductive pattern layer CP2 in a plan view. The light blocking layer LBL may comprise a light blocking material, but embodiments according to the present disclosure are not necessarily limited thereto.

The reflection control layer RCL may selectively absorb light of a wavelength range to control a reflectance and a color sense of the display device DD. According to some embodiments, the reflection control layer RCL may comprise a dye, a pigment, or a combination thereof. For example, the reflection control layer RCL may comprise one or more of a group of an oxazine-based compound, a cyanine-based compound, a tetraazoporphine-based compound, and a squarylium-based compound, but embodiments according to the present disclosure are not limited thereto.

According to some embodiments, sizes (or areas) of the sub-pixel areas SPXA may be different from each other. Areas of the first sub-pixel area SPXA1, the second sub-pixel area SPXA2, and the third sub-pixel area SPXA3 may be different from each other. For example, the area of the third sub-pixel area SPXA3 may be greater than that of the second sub-pixel area SPXA2. The area of the second sub-pixel area SPXA2 may be greater than that of the first sub-pixel area SPXA1. However, embodiments according to the present disclosure are not necessarily limited thereto. According to some embodiments, the area of the second sub-pixel area SPXA2 and the area of the first sub-pixel area SPXA1 may be equal to each other. Hereinafter, for convenience of description, aspects of some embodiments are illustrated and described in which the area of the second sub-pixel area SPXA2 is greater than that of the first sub-pixel area SPXA1.

According to some embodiments, a light emitting efficiency deviation for each color of the sub-pixel SPX may be compensated for by manufacturing the area of some sub-pixel areas SPXA to be different.

According to some embodiments, referring to FIG. 9, the outer part OUP may further comprise color filters CF1, CF2, and CF3. According to some embodiments, as the color filters CF1, CF2, and CF3 corresponding to colors of the respective first to third sub-pixels SPX1, SPX2, and SPX3 are located, a full-color image may be displayed.

A first color filter CF1 may overlap the first sub-pixel area SPXA1 in a plan view as a color filter for forming a first sub-pixel SPX1. The first color filter CF1 May selectively transmit the light of the first color. The first color filter CF1 may comprise a red color filter material as a red color filter.

A second color filter CF2 may overlap a second sub-pixel area SPXA2 in a plan view as a color filter for forming a second sub-pixel SPX2. The second color filter CF2 may selectively transmit the light of the second color. The second color filter CF2 may comprise a green color filter material as a green color filter.

A third color filter CF3 may overlap a third sub-pixel area SPXA3 in a plan view as a color filter for forming a third sub-pixel SPX3. The third color filter CF3 may selectively transmit the light of the third color. The third color filter CF3 may comprise a blue color filter material as a blue color filter.

The cross-sectional structure of the display device DD according to some embodiments is not necessarily limited to the above-described example.

Hereinafter, a structure of the first conductive pattern layer CP1, the second conductive pattern layer CP2, and the sub-pixels SPX of the display device DD according to some embodiments is described with reference to FIGS. 10 to 22. A content that may overlap the above-described content is simplified or is not repeated.

First, the display device DD according to some embodiments is described with reference to FIGS. 10 to 19. In the display device DD as illustrated and described with respect to FIGS. 10 to 19, the cells C may be formed by the second conductive pattern layer CP2.

FIGS. 10 to 19 are schematic diagrams illustrating the display device DD according to some embodiments.

FIGS. 10 to 13, 18, and 19 are schematic plan views illustrating the display device according to some embodiments. FIGS. 14 to 17 are schematic cross-sectional views illustrating the display device according to some embodiments.

Figure 10:
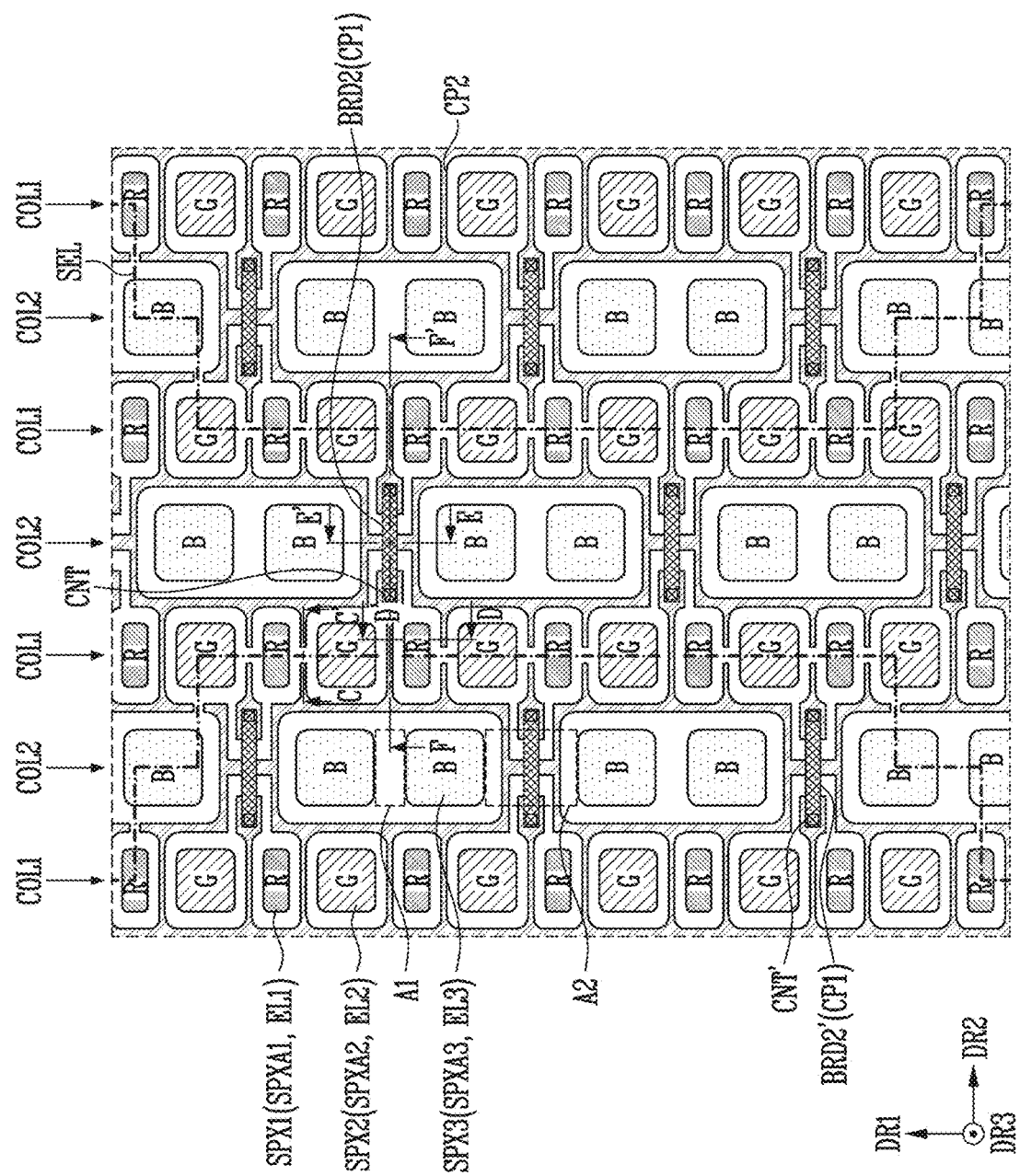
FIGS. 10 to 13, 18, and 19 are schematic plan views illustrating a display device according to some embodiments.
Figure 11:
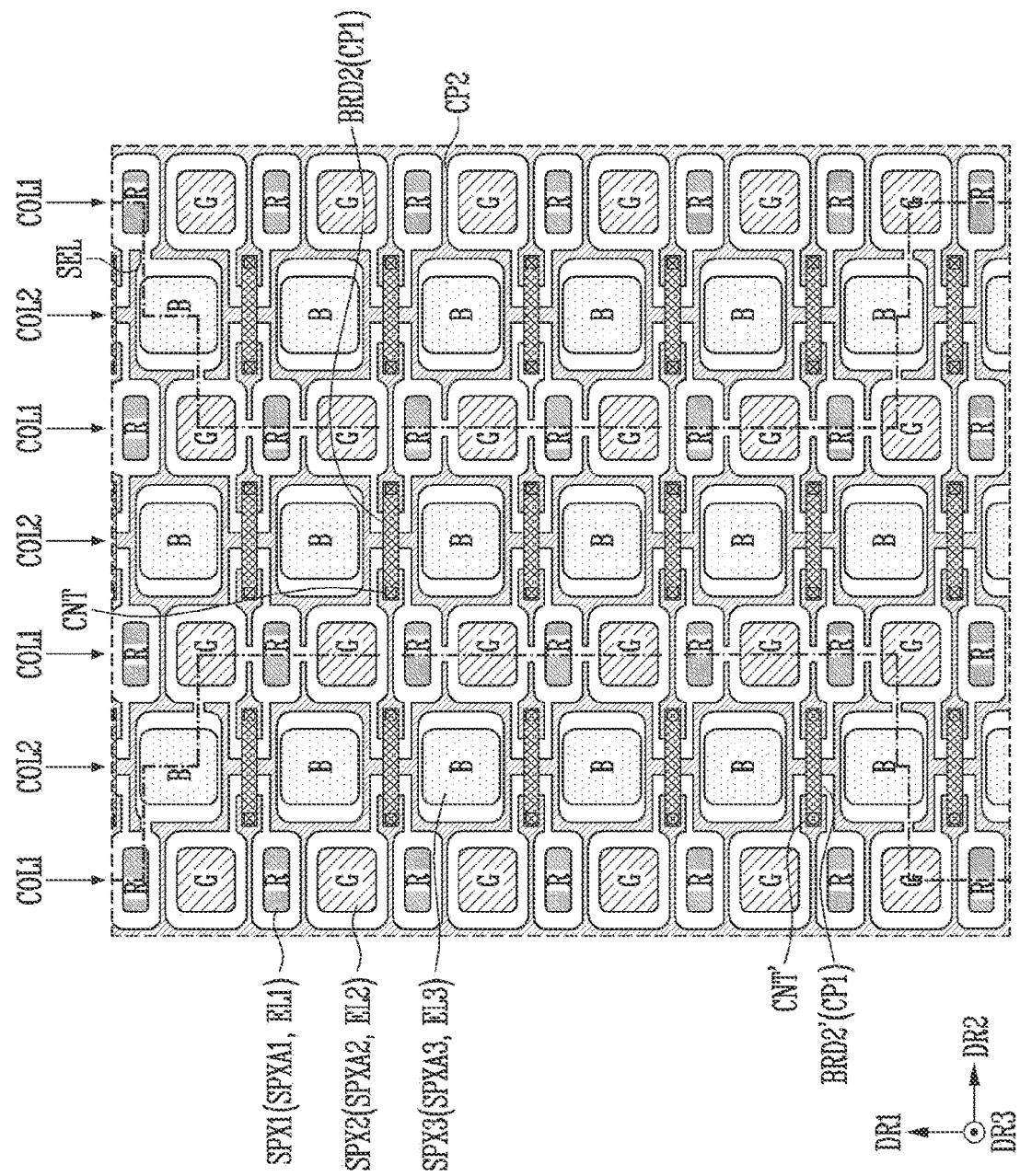

FIGS. 10 and 11 may be schematic plan views illustrating the sub-pixel areas SPXA, the first conductive pattern layer CP1, and the second conductive pattern layer CP2. FIGS. 10 and 11 show the sub-pixels SPX1, SPX2, and SPX3 (or the emission layers EL1, EL2, and EL3) forming the sub-pixel areas SPXA1, SPXA2, and SPXA3, and show the conductive pattern layers CP1 and CP2 formed around the sub-pixel areas SPXA.

FIG. 11 schematically shows adjacent pixels PXL1 and PXL2 based on an area where the second bridge BRD2 is located.

Figure 12:
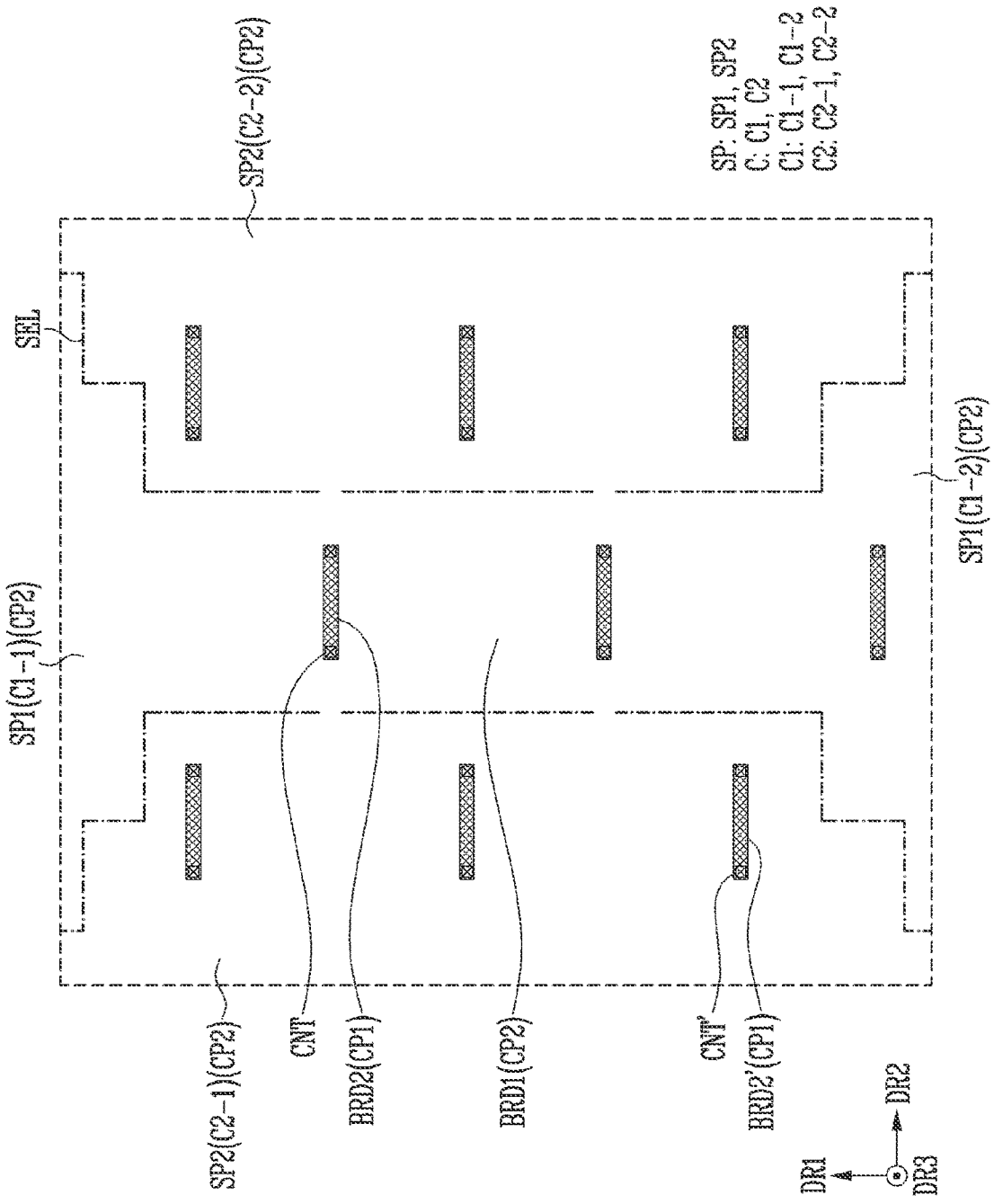

FIG. 12 is a plan view illustrating a display device DD according to some embodiments, and shows the sensing electrodes SP and the separating line SEL.

FIG. 12 omits the sub-pixels SPX1, SPX2, and SPX3 so that a relationship between the sensing electrodes SP and the separating line SEL may be more clearly understood. FIG. 12 may show the same area as FIGS. 10 and 11, and thus a positional relationship between the sensing electrodes SP and the separating line SEL and the sub-pixels SPX1, SPX2, and SPX3 will be clearly understood.

Referring to FIGS. 10 to 13, each of the sub-pixels SPX according to some embodiments may be arranged according to one structure. For example, the sub-pixels SPX may be arranged according to an S-stripe structure. In the following description, a positional relationship of the sub-pixels SPX1, SPX2, and SPX3 may correspond to a positional relationship of the sub-pixel areas SPXA1, SPXA2, and SPXA3 and/or the emission layers EL1, EL2, and EL3.

The first sub-pixel SPX1 and the second sub-pixel SPX2 may form a first pixel column COL1. The first sub-pixel SPX1 and the second sub-pixel SPX2 may be sequentially located on the first direction DR1. The first sub-pixel SPX1 and the second sub-pixel SPX2 may be alternately arranged on the first direction DR1. The first sub-pixel SPX1 and the second sub-pixel SPX2 may be located in the first pixel column COL1 without the third sub-pixel SPX3.

The third sub-pixel SPX3 may form a second pixel column COL2. The third sub-pixel SPX3 may be sequentially located on the first direction DR1. The third sub-pixel SPX3 may be located in the second pixel column COL2 without the first sub-pixel SPX1 and the second sub-pixel SPX2.

According to some embodiments, the third sub-pixels SPX3 may be spaced apart by a first distance in a first area A1, and other third sub-pixels SPX3 may be spaced apart by a second distance greater than the first distance in a second area A2 adjacent to the first direction DR1 in the first direction DR1 (FIG. 10). However, embodiments according to the present disclosure are not necessarily limited thereto. The third sub-pixels SPX3 may be spaced apart from each other at a uniform distance on the first direction DR1 (FIG. 11).

The first pixel column COL1 and the second pixel column COL2 may be adjacent to each other on the second direction DR2. For example, the first sub-pixel SPX1 may be adjacent to the third sub-pixel SPX3 on the second direction DR2. The second sub-pixel SPX2 may be adjacent to the third sub-pixel SPX3 on the second direction DR2.

The first pixel column COL1 and the second pixel column COL2 may be alternately arranged on the second direction DR2. For example, the second pixel column COL2 may be located between two first pixel columns COL1. The first pixel column COL1 may be located between two second pixel columns COL2.

The first sub-pixel SPX1 and the second sub-pixel SPX3 adjacent to each other on the first direction DR1 may form the pixel PXL (or a pixel unit) with the third sub-pixel SPX3 adjacent on the second direction DR2. For example, the first to third sub-pixels SPX1, SPX2, and SPX3 may form a first pixel PXL1, and the first to third sub-pixels SPX1, SPX2, and SPX3 may form a second pixel PXL2 in an area adjacent to the first pixel PXL1 in the first direction DR1. The pixels PXL may be sequentially arranged on the first direction DR1 and the second direction DR2.

According to some embodiments, the first sensing electrode SP1 and the second sensing electrode SP2 may be located adjacent to the sub-pixel areas SPXA. For example, the first sensing electrode SP1 and the second sensing electrode SP2 may be spaced apart from each other based on the separating line SEL. For example, the second cell C2 may be spaced apart from the first cell C1 with the separating line SEL interposed therebetween. The second cell C2 may be spaced apart from the first bridge BRD1 with the separating line SEL interposed therebetween.

The second conductive pattern layer CP2 may be arranged around the sub-pixel SPX (or the sub-pixel areas SPXA). The second conductive pattern layer CP2 may surround at least a portion of the sub-pixel areas SPXA in a plan view. The second conductive pattern layer CP2 may be arranged around the sub-pixel SPX to prevent light emitting efficiency from being reduced and minimize damage to external visibility. The light blocking layer LBL and the pixel defining layer PDL may be arranged around the sub-pixel SPX. For example, the second conductive pattern layer CP2 may be arranged to overlap the light blocking layer LBL and the pixel defining layer PDL.

According to some embodiments, at least a portion of the second conductive pattern layer CP2 may form a loop (for example, a closed loop or an open loop) surrounding one or more of the sub-pixel areas SPXA. Accordingly, the second conductive pattern layer CP2 may form a mesh structure.

Figure 14:
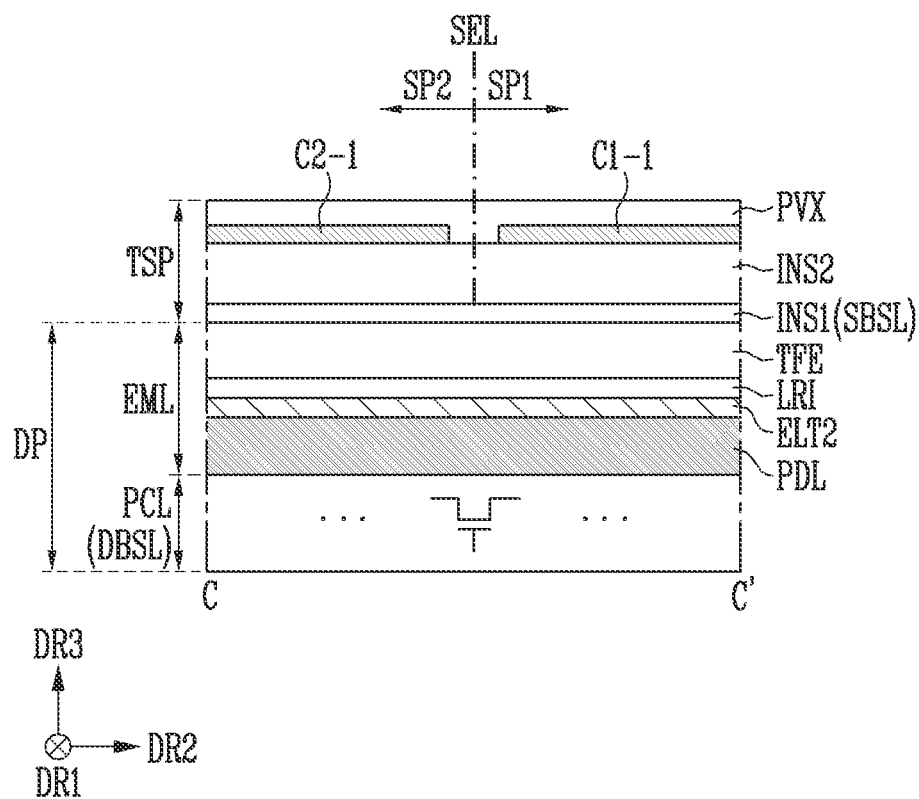
FIGS. 14 to 17 are schematic cross-sectional views illustrating the display device according to some embodiments.

According to some embodiments, at least a portion of the second conductive pattern layer CP2 may be disconnected at the separating line SEL. This is described with reference to FIG. 14. FIG. 14 is a schematic cross-sectional view taken on a line C~C' of FIG. 10.

Referring to FIG. 14 together, the first sensing electrode SP1 and the second sensing electrode SP2 may be spaced apart from each other with the separating line SEL interposed therebetween.

Since the second conductive pattern layers CP2 are electrically separated from each other with the separating line SEL interposed therebetween, the first sensing electrode SP1 and the second sensing electrode SP2 to which different sensing signals may be supplied may be defined.

At least a portion of the separating line SEL may extend on the first direction DR1 and pass through the first sub-pixel SPX1 and the second sub-pixel SPX2. For example, at least a portion of the separating line SEL may extend in the first direction DR1, and may pass through the first sub-pixel SPX1 and the second sub-pixel SPX1 of each of the first pixel PXL1 and the second pixel PXL2. For example, the separating line SEL may overlap the first sub-pixel SPX1 and the second sub-pixel SPX2 in a plan view. A portion of the separating line SEL may be located over the first sub-pixel SPX1 and the second sub-pixel SPX2 of the first pixel PXL1 and the first sub-pixel SPX1 and the second sub-pixel SPX2 of the second pixel PXL2.

According to some embodiments, the separating line SEL may not overlap the second bridge BRD2 in a plan view. The separating line SEL may not overlap an additional bridge BRD2' in a plan view. For example, a portion of the separating line SEL may be located on a side of the second bridge BRD2, and another portion of the separating line SEL may be located on another side of the second bridge BRD2.

Meanwhile, according to some embodiments, the first conductive pattern layer CP1 may form the second bridge BRD2. A technical feature of the second bridge BRD2 is described with reference to FIGS. 15 to 17 together.

Figure 13:
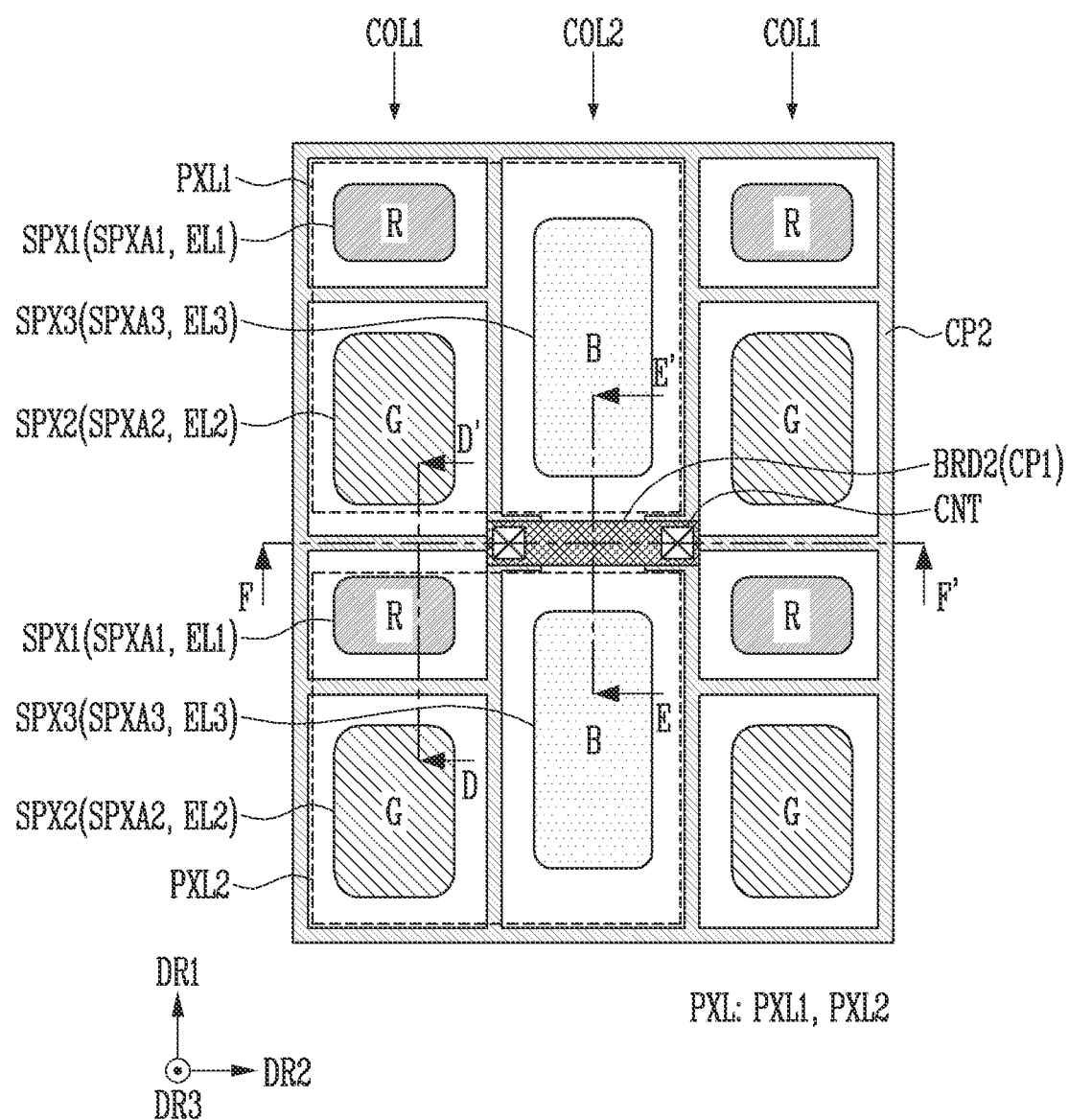
Figure 15:
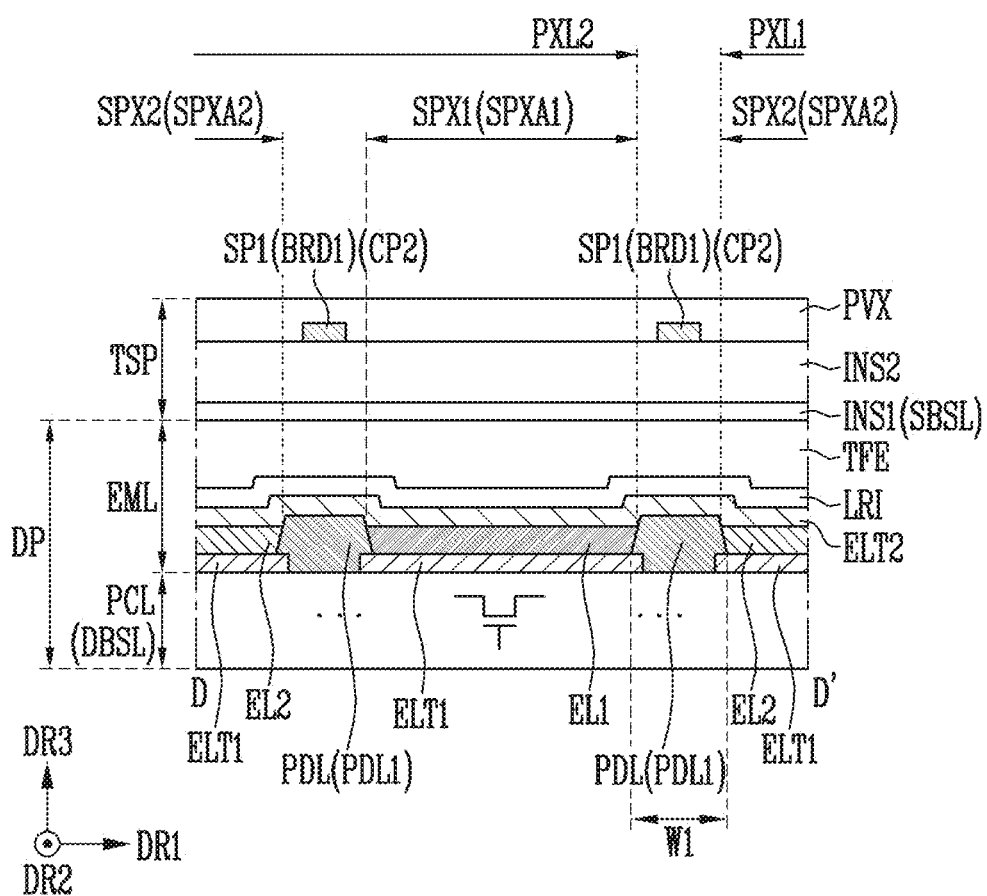
Figure 16:
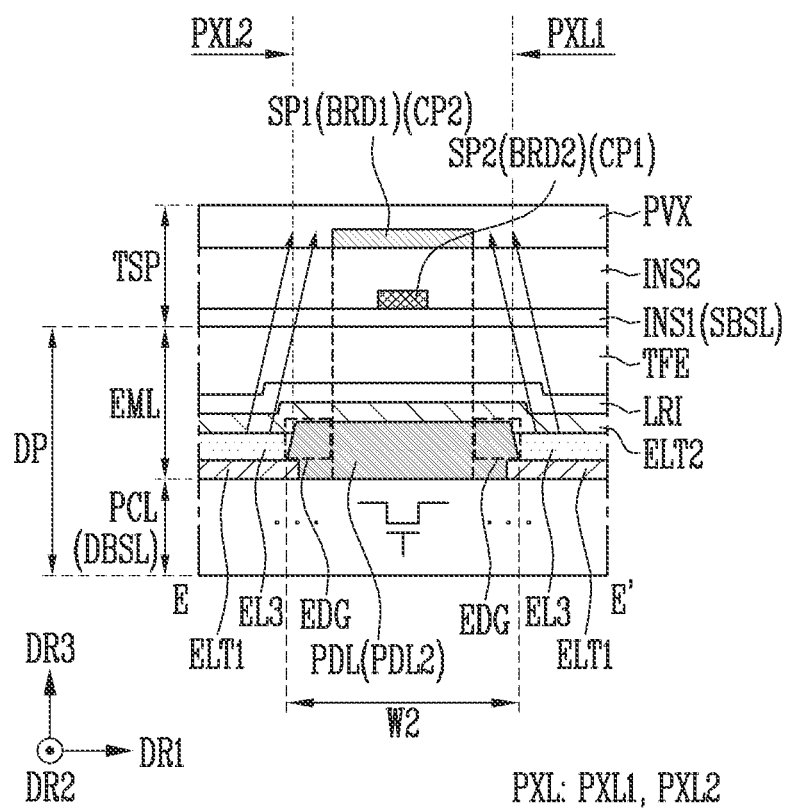
Figure 17:
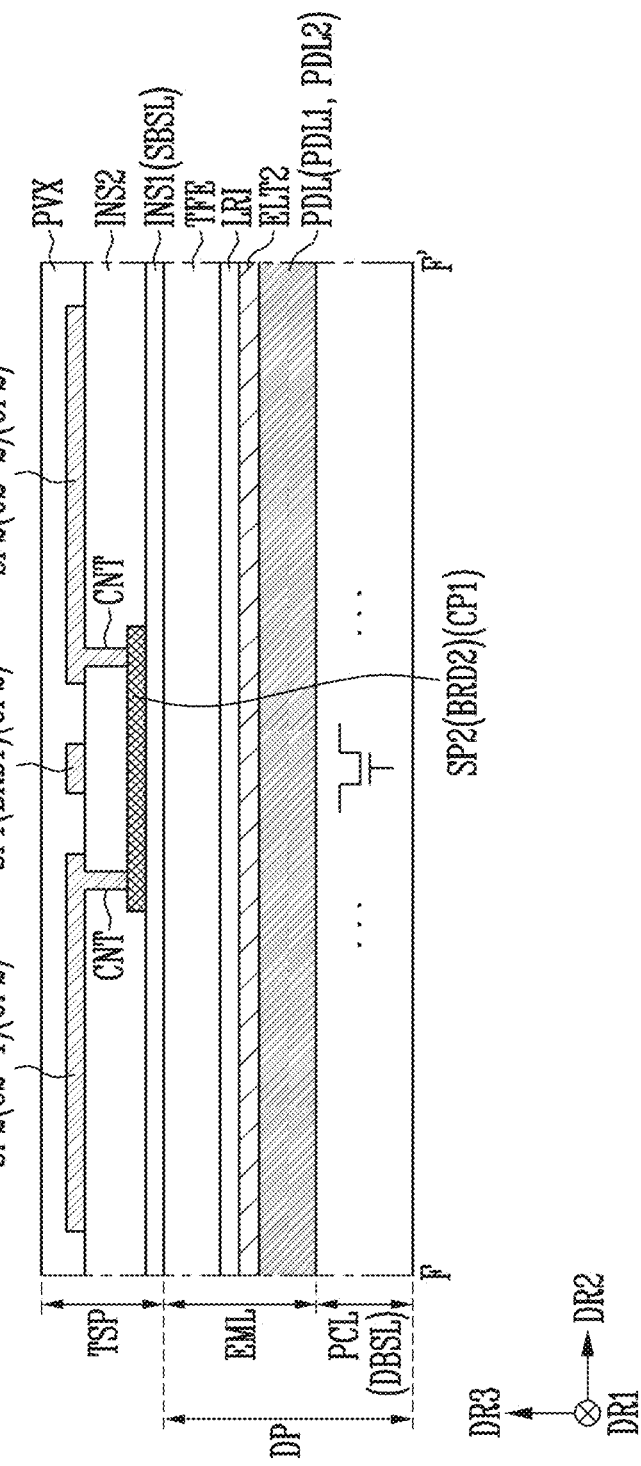

FIG. 15 is a schematic cross-sectional view taken on a line D-D' of FIGS. 10 and 13. FIG. 16 is a schematic cross-sectional view taken on a line E-E' of FIGS. 10 and 13. FIG. 17 is a schematic cross-sectional view taken on a line F-F' of FIGS. 10 and 13.

The second bridge BRD2 may electrically connect the (2-1)-th cell C2-1 and the (2-2)-th cell C2-2. For example, the second bridge BRD2 formed by the first conductive pattern layer CP1 may be electrically connected to a portion of the second sensing electrode SP2 (for example, the second bridge BRD2 formed by the second conductive pattern layer CP2) through the contact portion CNT. Accordingly, the second bridge BRD2 may electrically connect adjacent second sensing electrodes SP2 to each other.

The second bridge BRD2 may extend in a direction in which the (2-1)-th cell C2-1 and the (2-2)-th cell C2-2 are spaced apart from each other. For example, the second bridge BRD2 may extend on the second direction DR2. According to some embodiments, two or more second bridges BRD2 may be provided, and may electrically connect the second sensing electrodes SP2 adjacent to each other (for example, the (2-1)-th cell C2-1 and the (2-2)-th cell C2-2) at two or more positions. However, embodiments according to the present disclosure are not limited thereto.

According to some embodiments, the second bridge BRD2 may extend in the first direction DR1, and at least a portion of the second bridge BRD2 may extend in the first direction DR1.

According to some embodiments, the display device DD may further comprise the additional bridge BRD2'. The additional bridge BRD2' may be located in an area where the cell C is formed. The additional bridge BRD2' may be located on the same layer as the second bridge BRD2.

The additional bridge BRD2' may have a structure corresponding to the second bridge BRD2. For example, the additional bridge BRD2' may have the same shape as the second bridge BRD2. The additional bridge BRD2' may have the same length as the second bridge BRD2. The additional bridge BRD2' may have the same width as the second bridge BRD2.

The additional bridge BRD2' may be electrically connected to the second conductive pattern layer CP2 forming the sensing electrodes SP. For example, the additional bridge BRD2' may be electrically connected to the second conductive pattern layer CP2 forming the cell C through an additional contact portion CNT'.

The additional bridge BRD2' may comprise a plurality of additional bridges, and a distance at which the plurality of additional bridges are spaced apart from each other in the first direction DR1 may be the same as a distance at which the second bridges BRD2 are spaced apart from each other on the first direction DR1.

Accordingly, a structure corresponding to the second bridge BRD2 may be formed entirely in the sensing area SA. In this case, similarly to a case where the second bridge BRD2 is not formed in a localized position but is located entirely in the sensing area SA, a risk of damage to visibility may be reduced.

The second bridge BRD2 may pass between third sub-pixels SPX3 adjacent to each other. For example, at least another portion of the second bridge BRD2 may be located between the third sub-pixels SPX3 adjacent to each other. According to some embodiments, at least another portion of the second bridge BRD2 may be located between the third sub-pixel SPX3 of the first pixel PXL1 and the third sub-pixel SPX3 of the second pixel PXL2.

The second bridge BRD2 may not pass between the first sub-pixel SPX1 and the second sub-pixel SPX2. For example, the second bridge BRD2 may not be located between the first sub-pixel SPX1 and the second sub-pixel SPX2. According to some embodiments, the second bridge BRD2 may not be located between the first sub-pixel SPX1 of the first pixel PXL1 and the second sub-pixel SPX2 of the second pixel PXL2.

According to some embodiments, the second bridge BRD2 may be arranged to overlap the pixel defining layer PDL having a relatively large width on the first direction DR1.

For example, the pixel defining layer PDL may comprise a first pixel defining layer PDL1 having a first width W1 and a second pixel defining layer PDL2 having a second width W2. The second width W2 may be greater than the first width W1. According to some embodiments, the first width W1 and the second width W2 may be widths of each of the first pixel defining layer PDL1 and the second pixel defining layer PDL2 on the first direction DR1. Accordingly, a separation distance between the emission layers EL in the first pixel column COL1 may be less than a separation distance between the emission layers EL in the second pixel column COL2.

Each of the first pixel defining layer PDL1 and the second pixel defining layer PDL2 may be integrally formed as a portion of the pixel defining layer PDL. The first pixel defining layer PDL1 and the second pixel defining layer PDL2 may be spaced apart from each other on the second direction DR2. For example, the first pixel defining layer PDL1 and the second pixel defining layer PDL2 may be spaced apart in a direction different from a direction in which the first sub-pixel SPX1 and the second sub-pixel SPX2 are spaced apart from each other. The first pixel defining layer PDL1 and the second pixel defining layer PDL2 may be spaced apart in a direction in which the first sub-pixel SPX1 and the second sub-pixel SPX2 are spaced apart from the third sub-pixel SPX3. The first pixel defining layer PDL1 may overlap the first sub-pixel SPX1 and the second sub-pixel SPX2 on the first direction DR1. The second pixel defining layer PDL2 may overlap the third sub-pixel SPX3 on the first direction DR1.

According to some embodiments, the second bridge BRD2 may be selectively located on the second pixel defining layer PDL2 having a relatively wide width. For example, the second bridge BRD2 may overlap the second pixel defining layer PDL2 in a plan view. The second bridge BRD2 may not overlap the first pixel defining layer PDL1 in a plan view. In this case, the conductive pattern layers CP1 and CP2 may be entirely comprised in an area where the pixel defining layer PDL is located in a plan view, but an edge area EDG of the pixel defining layer PDL where the conductive pattern layers CP1 and CP2 are not located may be defined larger. The edge area EDG of the pixel defining layer PDL may be an area adjacent to (for example, directly adjacent to) the emission layer EL, and may be an area which does not overlap the conductive pattern layers CP1 and CP2 in a plan view.

Experimentally, when the edge area EDG of the pixel defining layer PDL is manufactured to be excessively narrow, a risk that light emitted from the emission layer EL may be interfered with by the conductive pattern layers CP1 and CP2 may occur. However, according to some embodiments, since the second bridge BRD2 is located on the second pixel defining layer PDL2 having the relatively wide second width W2 and is not be located on the first pixel defining layer PDL1 having the relatively narrow first width W1, the edge area EDG may be secured widely. Accordingly, a risk of occurrence of a light occlusion phenomenon in which a path of the emitted light is covered by the conductive pattern layers CP1 and CP2 may be reduced. As a result, light emission efficiency of the display device DD may be relatively improved, and the display device DD with relatively improved visibility may be provided. In particular, since a viewing angle of the emission layer EL may be determined relatively freely, the freedom degree of a process design of the display device DD may be relatively improved.

According to some embodiments, the contact portion CNT may not overlap the sub-pixels SPX on the first direction DR1. For example, the contact portion CNT may be located between the first pixel column COL1 and the second pixel column COL2. Accordingly, the second bridge BRD2 may not overlap the first pixel column COL1 on the first direction DR1.

According to some embodiments, the second bridge BRD2 may have a structure that generally extends in a direction (for example, the second direction DR2) in a plan view. According to some embodiments, the second bridge BRD2 may have a linear structure extending in the second direction DR2 rather than a mesh structure. In some embodiments, the second bridge BRD2 may have a structure extending in a direction without comprising a bent area in a plan view. In this case, the second bridge BRD2 may connect the contact portion CNT for the second sensing electrode SP2 located on a side and the contact portion CNT for the second sensing electrode SP2 located on a side at the shortest distance.

Figure 18:
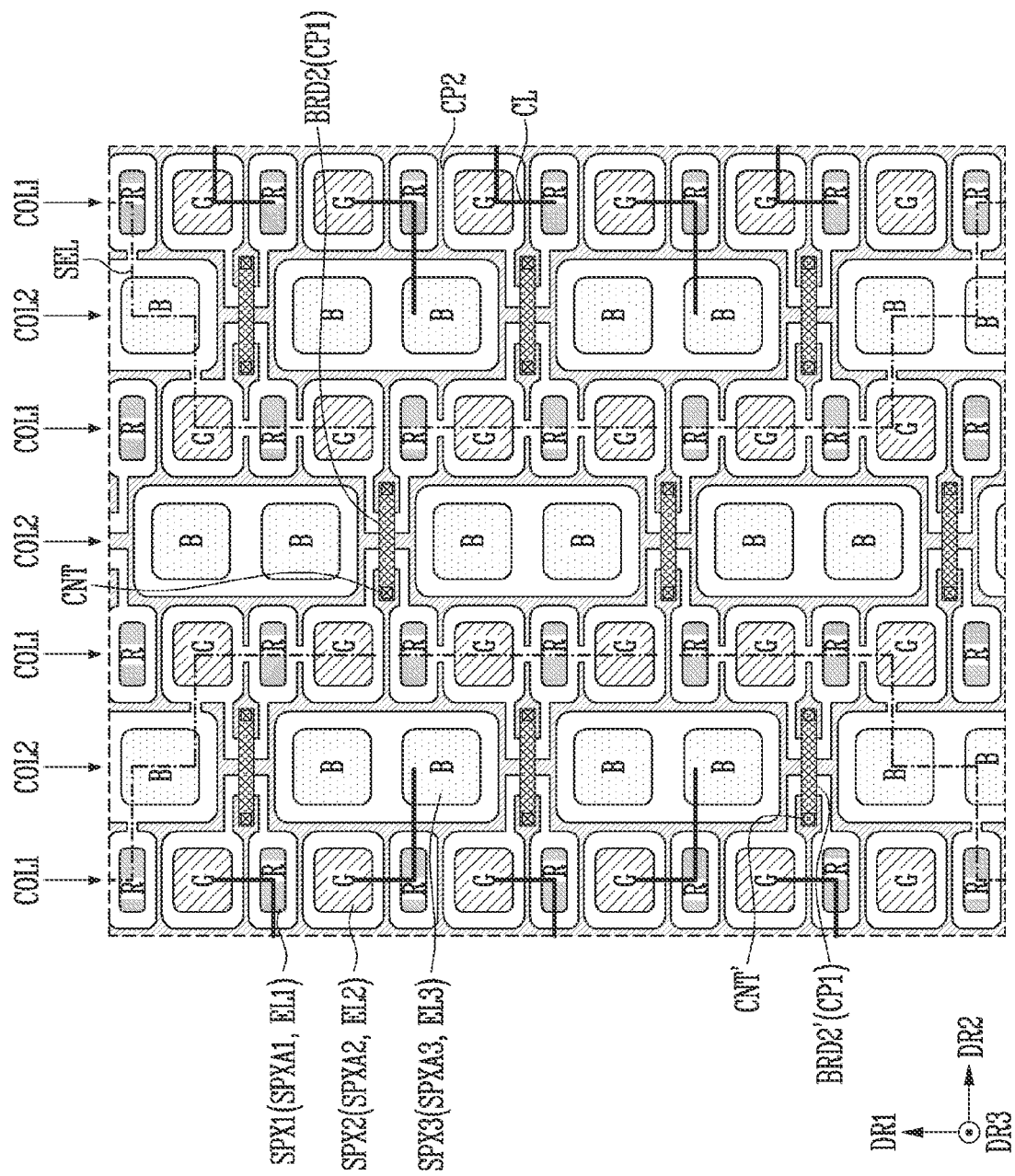
Figure 19:
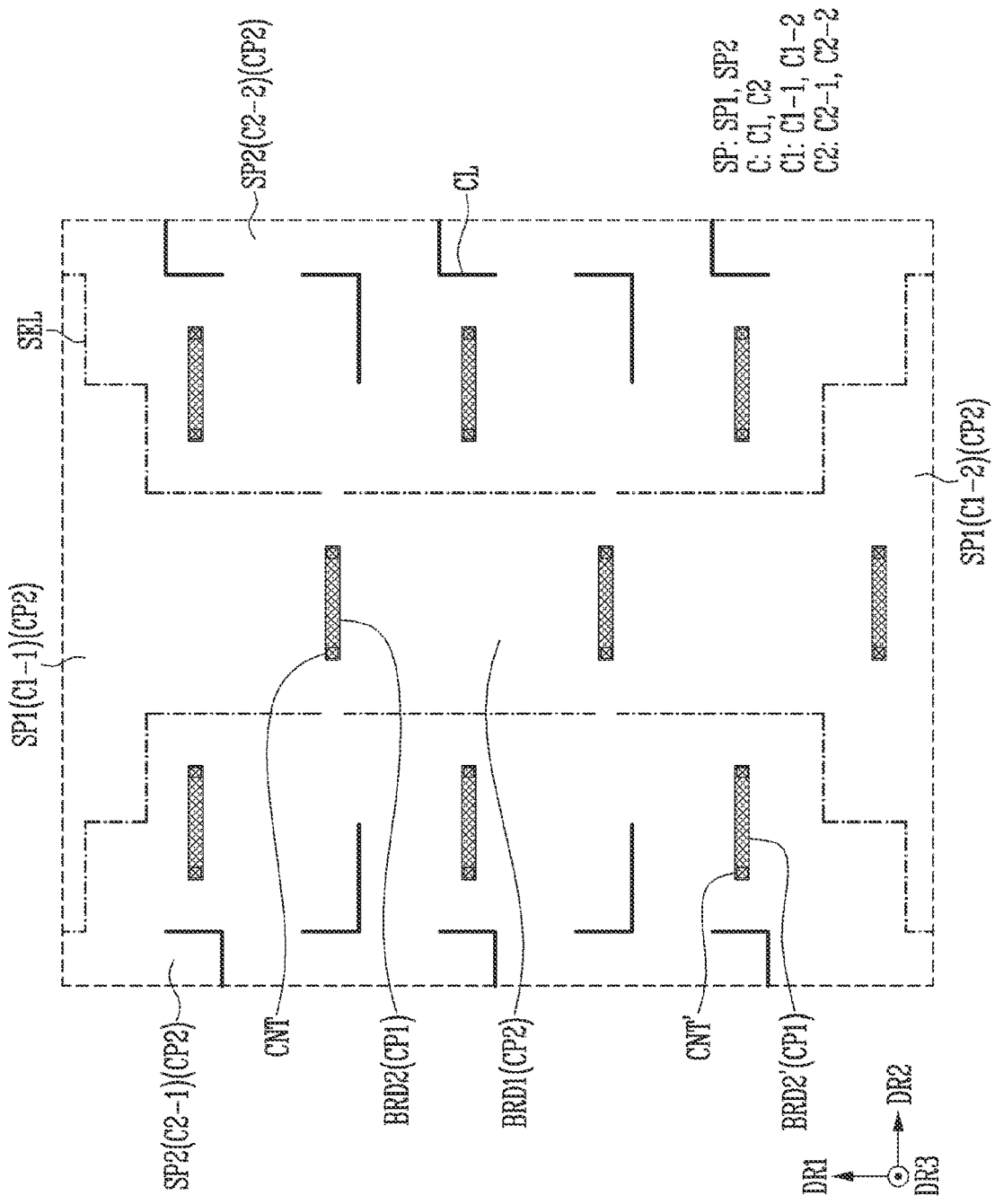

Meanwhile, referring to FIGS. 18 and 19, the cells C according to some embodiments may further comprise a cutting area CL. FIGS. 18 and 19 are plan views illustrating a display device DD according to some embodiments, and show the sensing electrodes SP and the cutting area CL. FIG. 18 may show the sensing electrodes SP and the cutting area CL, and may further show the sub-pixels SPX, and FIG. 19 shows the sensing electrodes SP and the cutting area CL, and omits the sub-pixels SPX for convenience of illustration, but embodiments are not limited thereto.

According to some embodiments, the cutting area CL may be an area where the second conductive pattern layer CP2 is disconnected. For example, at least a portion of the second conductive pattern layer CP2 may be disconnected in an area where the cells C are defined. For example, a portion of the second conductive pattern layer CP2 and another portion of the second conductive pattern layer CP2 may be spaced apart from each other with the cutting area CL interposed therebetween.

The cutting area CL may not overlap the second bridge BRD2 and the additional bridge BRD2' in a plan view. Accordingly, the second bridge BRD2 and the additional bridge BRD2' may form a repetitive pattern structure in the sensing area SA.

A portion of the cutting area CL may be bent to comprise one or more cutting portions. According to some embodiments, the cutting area CL may be formed in an area where the cells C are formed, and thus visibility may be relatively further improved. For example, when only the separating line SEL is formed locally, external visibility may be damaged due to a difference of an electrode arrangement structure, but the cutting area CL corresponding to a structure of the separating line SEL may be formed in the cells C, and thus light reflection may occur similarly to a substantially uniform electrode arrangement structure. Accordingly, a risk of damage to external visibility may be reduced.

Figure 20:
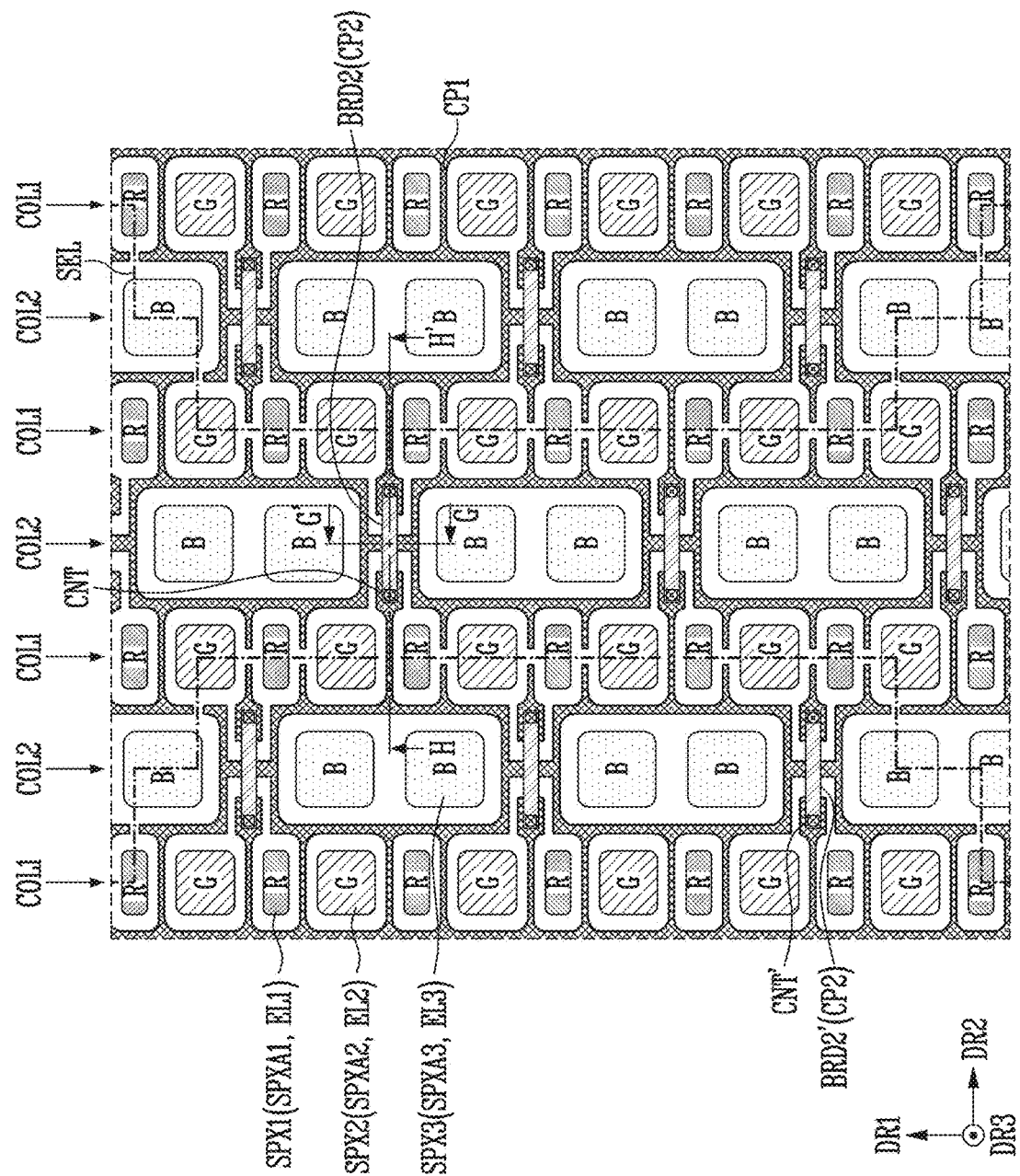
FIG. 20 is a schematic plan view illustrating a display device according to some embodiments.
Figure 21:
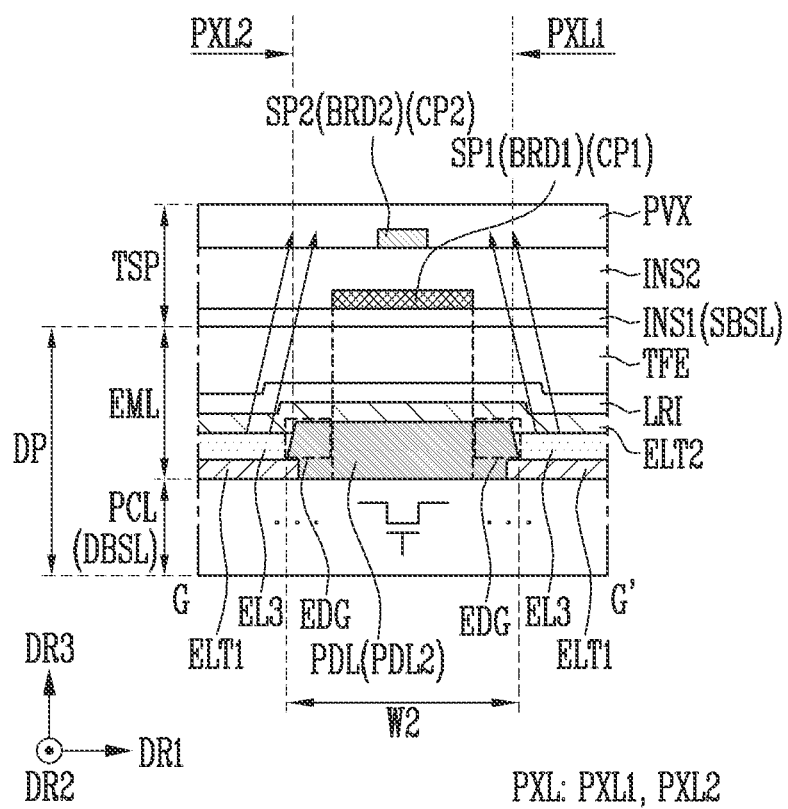

Next, a display device DD according to some embodiments is described with reference to FIGS. 20 to 22. The display device DD according to some embodiments as illustrated in FIGS. 20-22 is different the display device DD according some embodiments as illustrated in FIGS. 10-19 in that the first conductive pattern layer CP1 forms the cell C and the second conductive pattern layer CP2 forms the second bridge BRD2. A content that may overlap the above-described content may be simplified or may not be repeated.

FIGS. 20 to 22 are schematic diagrams illustrating the display device DD according to some embodiments.

FIG. 20 is a schematic plan view illustrating the display device according to some embodiments. FIGS. 21 and 22 are schematic cross-sectional views illustrating the display device according to some embodiments.

FIG. 21 is a schematic cross-sectional view taken on a line G~G' of FIG. 20. FIG. 22 is a schematic cross-sectional view taken on a line H~H' of FIG. 20. FIG. 21 may indicate a technical feature corresponding to FIG. 16. FIG. 22 may indicate a technical feature corresponding to FIG. 17.

Among the technical features described with respect to FIGS. 10-19, the features of the first conductive pattern layer CP1 may correspond to the features of the second conductive pattern layer CP2 as illustrated and described with respect to FIGS. 21 and 22, and the features of the second conductive pattern layer CP2 may correspond to the features of the first conductive pattern layer CP1 as illustrated and described with respect to FIGS. 21 and 22.

For example, as illustrated in FIGS. 21 and 22, the first cell C1 and the second cell C2 may be formed by the first conductive pattern layer CP1. The first bridge BRD1 may be formed by the first conductive pattern layer CP1. A portion of the second bridge BRD2 may be formed by the second conductive pattern layer CP2, and another portion of the second bridge BRD2 may be formed by the first conductive pattern layer CP1.

According to some embodiments, the second bridge BRD2 may be formed by the second conductive pattern layer CP2 and may overlap the second pixel defining layer PDL2 in a plan view. The second bridge BRD2 may overlap the first pixel defining layer PDL1 in a plan view.

According to some embodiments, the second bridge BRD2 formed by the second conductive pattern layer CP2 may electrically connect the second sensing electrodes SP2 adjacent to each other (for example, the second bridges BRD2 formed by the first conductive pattern layer CP1).

According to some embodiments, the second bridge BRD2 may be formed by the second conductive pattern layer CP2 relatively located at an upper portion, and may overlap the second pixel defining layer PDL2 having the second width W2. In this case, the edge area EDG of the pixel defining layer PDL may be secured widely, and a risk that the path of the light emitted from the emission layer EL is interfered with by the second bridge BRD2 may be further reduced. For example, the light emitted from the emission layer EL may be emitted in an upper direction (for example, in a third direction DR3). At this time, the emitted light may be provided on a light path having one angle with respect to a base layer BSL. At this time, when the second conductive pattern layer CP2 located at a relatively upper portion is not sufficiently spaced apart from the edge area EDG of the pixel defining layer PDL, a concern that the light path may be interfered with may exist. However, according to some embodiments, the second bridge BRD2 located at a relatively upper portion is selectively located on the second pixel defining layer PDL2 having the relatively wide second width W2, and thus the second conductive pattern layer CP2 may be sufficiently spaced apart from ends of the second pixel defining layer PDL2. Accordingly, the concern that the light path May be interfered with may be reduced, and as a result, light emission efficiency of the display device DD may be relatively improved.

As described above, although aspects of some embodiments of the disclosure have been described with reference to the example embodiments illustrated and described above, those skilled in the art or those having a common knowledge in the art will understand that the disclosure may be variously modified and changed without departing from the spirit and technical area of the disclosure as defined in the appended claims and their equivalents.

Therefore, the technical scope of the disclosure should not be limited to the contents described in the detailed description of the specification, but should be defined by the claims, and their equivalents.

What is claimed is:

1. A display device comprising:
    a display part on a base layer and forming a plurality of pixels comprising a first pixel and a second pixel; and
    a sensor part on the display part and comprising conductive pattern layers comprising a first conductive pattern layer and a second conductive pattern layer,
    wherein each of the plurality of pixels comprises sub-pixels comprising a first sub-pixel forming a first sub-pixel area configured to provide light of a first color, a second sub-pixel forming a second sub-pixel area configured to provide light of a second color, and a third sub-pixel forming a third sub-pixel area configured to provide light of a third color,
    the first pixel and the second pixel are adjacent to each other in a first direction,
    the third sub-pixel of the first pixel is adjacent to the third sub-pixel of the second pixel in the first direction,
    the first sub-pixel and the second sub-pixel of the first pixel are adjacent to the first sub-pixel and the second sub-pixel of the second pixel in the first direction,
    the conductive pattern layer comprises a first sensing electrode and a second sensing electrode,
    the first sensing electrode comprises first cells and a first bridge electrically connecting the first cells,
    the second sensing electrode comprises second cells and a second bridge electrically connecting the second cells,
    the second bridge is not between the first sub-pixel of the first pixel and the second sub-pixel of the second pixel, and at least a portion of the second bridge is between the third sub-pixel of the first pixel and the third sub-pixel of the second pixel.

2. The display device according to claim 1, wherein the second bridge does not overlap the first sub-pixel and the second sub-pixel in the first direction.

3. The display device according to claim 1, wherein the second bridge extends in a second direction different from the first direction.

4. The display device according to claim 1, wherein the display part comprises a light emitting unit and a pixel defining layer surrounding at least a portion of the light emitting unit,
    the pixel defining layer comprises a first pixel defining layer overlapping the first sub-pixel and the second sub-pixel on the first direction and a second pixel defining layer overlapping the third sub-pixel on the first direction,
    the first pixel defining layer has a first width,
    the second pixel defining layer has a second width greater than the first width, and
    the second bridge is on the second pixel defining layer in a plan view.

5. The display device according to claim 4, wherein the first pixel defining layer and the second pixel defining layer are adjacent on a second direction different from the first direction, and
    the second bridge does not overlap the first pixel defining layer on the first direction and overlaps the second pixel defining layer.

6. The display device according to claim 4, wherein the second pixel defining layer comprises an edge area comprising an area that does not overlap the second bridge in the plan view.

7. The display device according to claim 1, wherein the first cells and the second cells are spaced apart from each other with a separating line interposed therebetween, and
    at least a portion of the separating line extends on the first direction and passes through the first sub-pixel and the second sub-pixel.

8. The display device according to claim 7, wherein the separating line does not overlap the second bridge in a plan view.

9. The display device according to claim 7, wherein the separating line is a virtual line comprising an area in which the conductive pattern layers are not located.

10. The display device according to claim 1, wherein the second bridge is electrically connected to the second conductive pattern layer through a contact portion, and
the contact portion does not overlap the first sub-pixel area, the second sub-pixel area, and the third sub-pixel area on the first direction.

11. The display device according to claim 10, wherein the contact portion is between the first sub-pixel area and the second sub-pixel area, and the third sub-pixel area.

12. The display device according to claim 1, wherein an area of the third sub-pixel area is greater than an area of the first sub-pixel area and an area of the second sub-pixel area.

13. The display device according to claim 12, wherein the third sub-pixel forms a plurality of third sub-pixels,
the plurality of third sub-pixels are spaced apart by a first distance in a first area and are spaced apart by a second distance greater than the first distance in a second area adjacent to the first area in the first direction.

14. The display device according to claim 12, wherein the third sub-pixel forms a plurality of third sub-pixels, and
the plurality of third sub-pixels are spaced apart from each other at a uniform distance on the first direction.

15. The display device according to claim 7, further comprising:
an additional bridge having a structure corresponding to the second bridge,
wherein the second bridge and the additional bridge are formed by the second conductive pattern layer.

16. The display device according to claim 15, wherein the additional bridge does not overlap the separating line in the plan view.

17. The display device according to claim 1, further comprising:
a cutting area in which at least a portion of the second conductive pattern layer is cut in an area where the first cells or the second cells are formed.

18. The display device according to claim 1, wherein the second bridge is formed by the first conductive pattern layer.

19. The display device according to claim 1, wherein the second bridge is formed by the second conductive pattern layer.

20. A display device comprising:
a display part on a base layer and forming a plurality of pixels comprising a first pixel and a second pixel; and
a sensor part on the display part and comprising conductive pattern layers comprising a first conductive pattern layer and a second conductive pattern layer,
wherein each of the plurality of pixels comprises sub-pixels comprising a first sub-pixel forming a first sub-pixel area configured to provide light of a first color, a second sub-pixel forming a second sub-pixel area configured to provide light of a second color, and a third sub-pixel forming a third sub-pixel area configured to provide light of a third color,
the first pixel and the second pixel are adjacent to each other in a first direction,
the third sub-pixel of the first pixel is adjacent to the third sub-pixel of the second pixel in the first direction,
the first sub-pixel and the second sub-pixel of the first pixel are adjacent to the first sub-pixel and the second sub-pixel of the second pixel in the first direction,
the display part comprises a light emitting unit and a pixel defining layer surrounding at least a portion of the light emitting unit,
the pixel defining layer surrounds at least a portion of each of the first sub-pixel area, the second sub-pixel area, and the third sub-pixel area in a plan view,
the conductive pattern layer comprises a first sensing electrode and a second sensing electrode,
the first sensing electrode comprises first cells and a first bridge electrically connecting the first cells,
the second sensing electrode comprises second cells and a second bridge electrically connecting the second cells,
the pixel defining layer comprises a first pixel defining layer overlapping the first sub-pixel and the second sub-pixel on the first direction and a second pixel defining layer overlapping the third sub-pixel on the first direction,
the first pixel defining layer has a first width,
the second pixel defining layer has a second width greater than the first width,
at least a portion of the second bridge extends in a second direction different from the first direction, and
the second bridge is on the second pixel defining layer in the plan view.

* * * * *